United States Patent
von der Embse

(10) Patent No.: US 8,630,362 B1
(45) Date of Patent: Jan. 14, 2014

(54) QLM CO-STATE MAP TRELLIS

(75) Inventor: Urbain Alfred von der Embse, Westchester, CA (US)

(73) Assignee: Urbain A. von der Embse, Westchester, CA (US)

( * ) Notice: Subject to any disclaimer, the term of this patent is extended or adjusted under 35 U.S.C. 154(b) by 329 days.

(21) Appl. No.: 13/068,032

(22) Filed: May 2, 2011

(51) Int. Cl.
  *H04L 5/12* (2006.01)

(52) U.S. Cl.
  USPC .......................... 375/262; 375/260; 375/261

(58) Field of Classification Search
  USPC .................. 375/262, 261, 260, 264, 265, 341; 714/794, 792; 370/204, 208
  See application file for complete search history.

(56) References Cited

U.S. PATENT DOCUMENTS

| | | | |
|---|---|---|---|
| 6,426,723 B1 | 7/2002 | Smith |
| 6,504,506 B1 | 1/2003 | Thomas |
| 6,636,568 B2 | 10/2003 | Kadous |
| 6,647,078 B1 | 11/2003 | Thomas |
| 6,674,712 B1 | 1/2004 | Yang |
| 6,728,517 B2 | 4/2004 | Sugar |
| 6,731,618 B1 | 5/2004 | Chung |
| 6,731,668 B2 | 5/2004 | Ketchum |
| 6,798,737 B1 | 9/2004 | Dabak |
| 6,856,652 B2 | 2/2005 | West |
| 7,277,382 B1 | 10/2007 | von der Embse |
| 7,337,383 B1 | 2/2008 | von der Embse |
| 7,352,796 B1 | 4/2008 | von der Embse |
| 7,376,688 B1 | 5/2008 | von der Embse |
| 7,391,819 B1 | 6/2008 | von der Embse |
| 7,394,792 B1 | 7/2008 | von der Embse |
| 7,558,310 B1 | 7/2009 | von der Embse |
| 7,599,452 B2 | 10/2009 | Nielsen |
| 7,680,211 B1 | 3/2010 | von der Embse |
| 7,855,995 B1 | 12/2010 | von der Embse |
| 7,907,512 B1 | 3/2011 | von der Embse |

OTHER PUBLICATIONS

U.S. Appl. No. 12/069,418, filed Feb. 11, 2008, von der Embse.
U.S. Appl. No. 12/151,986, filed May 12, 2008, von der Embse.
C.E. Shannon "A Mathematical Theory of Communications", Bell System Technical Journal, 27:379-423, 623-656, Oct. 1948.
Vucetec and J. Yuan's book "Turbo Codes", Kluwer Academic Publishers 2000.
J.G. Proakis's book "Digital Communications". McGraw Hill, Inc. 1995.
Hanzo, C.H. Wong, M.S. Lee's book "Adaptive Wireless Transceivers", John Wiley & Sons 2002.
Thomas S. Ferguson's book "Mathematical Statistics", Academic Press 1967.

*Primary Examiner* — Shuwang Liu
*Assistant Examiner* — Helene Tayong

(57) ABSTRACT

This invention discloses a new Co-State Maximum A-Posterior (MAP) trellis algorithm for implementing Quadrature Layered Modulation (QLM) demodulation over multiple layered channels. This MAP trellis algorithm has been demonstrated to provide performance which is at least as good as the current Maximum Likelihood (ML) trellis algorithm and to support a considerable reduction in the number of trellis paths to reduce the computational complexity. Computational complexity prevents ML trellis demodulation of higher order data symbol metrics over multiple layered channels since there is no viable means to support fewer trellis paths. MAP algorithms for reduction of trellis paths are disclosed for data symbol waveforms representative of OFDM, SC-OFDM, satellite, media, wire, and optical communications. QLM waveforms have mainlobes in time/frequency approximating square pulse mainlobes and have sidelobes which are relatively low to facilitate using iterative MAP trellis algorithms which include both mainlobes and sidelobes.

7 Claims, 30 Drawing Sheets

25  1) New Nyquist data symbol rate $= n_p/T_s$ 26  2) New bound on capacity C and information rate "b"

$C = \max\{ n_p B \log_2(1+(S/N)/n_p{}^\wedge 2) \}$  Bps,  over $n_p$ $b = C/B$     bits/( symbol interval $T_s=1/B$ )

$= \max\{ n_p \log_2( 1 + (S/N)/n_p{}^\wedge 2 ) \}$    over $n_p$ $= \eta$      Bps/Hz    communication efficiency 27  3) $BT_s = 1+\alpha$   where  $\alpha$  is the excess bandwidth $= 1$   using a QLM Wavelet waveform

FIG. 4

$\hat{z}_k$

30  ML Matlab code for selecting "i" for the best ML trellis path "jx"

for jx = 1: $n_s$^(2*$n_p$-2)
  $\alpha_k(jx)$ = min{$\alpha_{k-1}(xi) + R_k(jxi)$} wherein the "min"
            is over the "i" values
          = new ML metric at step k for path "jx"
end ML state update $S_k(:,jx) = [\hat{z}_k(jxi); S_{k-1}(1:D-1,xi)]$    for $k \geq D$ 31  MAP Matlab code for selecting "j" for the best MAP trellis path "xi"

for xi = 1: $n_s$^(2*$n_p$-2)
  $\alpha_k(xi)$ = min{$\alpha_{k-1}(jx) + R_k(jxi)$} wherein the "min"
            is over the "j" values
          = new MAP metric at step k for path "xi"
end MAP state update: $S_k(:,xi) = [\hat{z}_k(jxi); S_{k-1}(1:D-1,jx)]$    for $k \geq D$

FIG. 8

MAP Trellis States (Nodes)

250　Each node has $(2n_p-1)$ correlated data symbols over the mainlobe

251　Trellis nodes (states) $= 2^{\wedge}b_s(2n_p-2)$　　trellis data symbol algorithm
　　　　　　　　　　　$= 2^{\wedge}(b_s/2)(2n_p-2)$　　1/2-word algorithm
　　　　　　　　　　　$= 2^{\wedge}(b_p + b_w(2n_p-2))$　reduced path trellis algorithm

| Algorithm | QLM Data Rate Change = Number $n_p$ of Overlayed Channels | | |
|---|---|---|---|
| | 2 | 3 | 4 |
| Data symbol trellis | $2^{\wedge}16$ | $2^{\wedge}32$ | $2^{\wedge}48$ |
| 1/2-word trellis | $2^{\wedge}8$ | $2^{\wedge}16$ | $2^{\wedge}24$ |
| Reduced path trellis | $2^{\wedge}4-2^{\wedge}8$ | $2^{\wedge}6-2^{\wedge}12$ | $2^{\wedge}8-2^{\wedge}16$ |

FIG. 17, 18 Parameters

| | Reference | Symbol | Bits/Symbol | np Layers | b Bits/Hz |
|---|---|---|---|---|---|
| MAP Trellis | 1 | 8PSK | 2 | 2 | 4 |
| | 2 | 16QAM | 3 | 2 | 6 |
| | 3 | 16QAM | 4 | 3 | 9 |
| | 4 | 64QAM | 4 | 3 | 12 |
| | 5 | 64QAM | 4 | 4.5 | 18 |
| | | 64QAM | 4 | 6 | 24 |
| | | 256QAM | 6 | 4 | 24 |
| ML ns=4 | 1 | 8PSK | 2 | 4 | 6.5 |
| | 2 | 16QAM | 3 | 4 | 9.75 |
| | 3 | 64QAM | 4 | 4 | 13 |
| | | 256QAM | 6 | 4 | 19.5 |
| ML ns=4 | 1 | 8PSK | 2 | 6 | 9.5 |
| | 2 | 16QAM | 3 | 6 | 14.25 |
| | 3 | 64QAM | 4 | 6 | 19 |
| | | 256QAM | 6 | 6 | 28.5 |

FIG. 19

QLM CO-STATE MAP TRELLIS

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

I. Field of the Invention

The present invention relates to cellular communications and also relates to the Nyquist rate for data symbol transmission, the Shannon bound on communications capacity, and symbol modulation and demodulation for high-data-rate satellite, airborne, wired, wireless, and optical communications and includes all of the communications symbol modulations and the future modulations for single links and multiple access links which include electrical and optical, wired, mobile, point-to-point, point-to-multipoint, multipoint-to-multipoint, cellular, multiple-input multiple-output MIMO, terrestrial networks, and satellite communication networks. In particular it relates to WiFi, WiMax and long-term evolution LTE for cellular communications and satellite communications. WiFi, WiMax use orthogonal frequency division multiplexing OFDM on both links and LTE uses single carrier OFDM (SC-OFDM) on the uplink from user to base station and OFDM on the downlink form base station to user. WiMax occupies a larger frequency band than WiFi and both use OFDM waveforms. SC-OFDM LTE is a single carrier orthogonal waveform version of OFDM which uses orthogonal frequency subbands of varying widths.

II. Description of the Related Art

Bounds on current communications capacity are the communications Nyquist rate and the Shannon capacity theorem. The Nyquist rate is the complex digital sampling rate equal to B that is sufficient to include all of the information within a frequency band B over a communications link. For communications, equivalent expressions for the Nyquist rate bound are defined in equations (1).

$$T_s \geq 1/B$$

$$BT_s \geq 1 \quad (1)$$

wherein $1/T_s$ is the data symbol transmission rate in the frequency band B which means $T_s$ is the spacing between the data symbols.

The Shannon bound for the maximum data rate C is a bound on the corresponding number of information bits per symbol b as well as a bound on the communications efficiency η and is complemented by the Shannon coding theorem, and are defined in equations (2).

Shannon Bounds and Coding Theorem

1 Shannon capacity theorem $C = B \log_2(1 + S/N)$ Channel capacity in bits/second=Bps
for an additive white Gaussian noise AWGN
channel with bandwidth B wherein "$\log_2$" is the logarithm to the base 2

=Maximum rate at which information can be reliably
transmitted over a noisy channel where S/N is the
signal-to-noise ratio in B (2)

2 Shannon bound on b, η, and $E_b/N_o$ $$\max\{b\} = \max\{C/B\}$$
$$= \log_2(1 + S/N)$$
$$= \max\{\eta\}$$

$$E_b/N_o = [2^{\max\{b\}} - 1]/\max\{b\}$$

wherein
b=CB in Bps/Hz=Bits/symbol
η=b/$T_s$B, Bps/Hz
$T_s$=symbol interval

3 Shannon coding theorem for the information bit rate $R_b$
For $R_b < C$ there exists codes which support reliable communications
For $R_b > C$ there are no codes which support reliable communications wherein $E_b/N_o$ is the ratio of energy per information bit $E_b$ to the noise power density $N_o$, max{b} is the maximum value of the number of information bits per symbol b and also is the information rate in Bps/Hz, and since the communications efficiency η=b/($T_s$B) in bits/sec/Hz it follows that maximum values of b and η are equal. Derivation of the equation for $E_b/N_o$ uses the definition $E_b/N_o$=(S/N)/b in addition to 1 and 2. Reliable communications in the statement of the Shannon coding theorem 3 means an arbitrarily low bit error rate BER.

MIMO communications enable higher capacities to be supported with multiple independent links over the same bandwidth. This multiple-input multiple-output MIMO requires the physical existence of un-correlated multiple communications paths between a transmitter and a receiver. MIMO uses these multiple paths for independent transmissions when the transmission matrix specifying these paths has a rank and determinant sufficiently large to support the paths being used. In MIMO U.S. Pat. No. 7,680,211 a method is disclosed for constructing architectures for multiple input transmit and multiple output receive MIMO systems with generalized orthogonal space-time codes ($C_O$) which are generalization of space-time codes C and generalizations ($H_O$) of the transmission matrix (H) that enable the MIMO equation Y=Hf(C,X)+No to be written Y=$H_O C_O X+N_o$ which factors out the input signal symbol vector X and allows a direct maximum-likelihood ML calculation of the estimate $\hat{X}$ of X, and wherein Y is the received symbol vector, $N_o$ is the received noise vector, and f(C,X) is a non-separable encoding C of X FIG. 1 defines the orthogonal frequency division multiplexing OFDM waveform for the WiFi 802.16 standard power spectrum 1, 2 which implements the inverse FFT (IFFT=$FFT^{-1}$) to generate OFDM (or equivalently OFDMA which is orthogonal frequency division multiple access to emphasize the multiple access applications) data symbol tones 2 over the first 3.2 μs of the 4 μs data packet in 30 in FIG. 7 with some rolloff of the tones at their ends for spectral containment. Data symbol tones are modulated with 4PSK, 16QAM, 64QAM, 256QAM depending on the transmission range and data rate and for 256QAM using the code rate option R=¾ yields the information rate b=6 Bps/Hz for the WiFi standard, with other code options available. The N=64 point $FFT^{-1}$ generates N=64 tones in 2 over the 20 MHz WiFi band with 48 tones used for data transmission. In 3 the WiFi parameters are defined including a calculation of the maximum data rate $R_b$=57 Mbps. Later versions of WiFi allow WiFi bands of 1.25, 5, 10, 20 MHz corresponding to N=4, 16, 32, 64. For this representative OFDM WiFi QLM disclosure we are considering the WiFi standard in FIG. 1. The maximum data rate supported by WiFi standard is calculated in 3 to be ~57 Mbps using 256QAM modulation and wherein "~" represents an approximate value. OFDM uses pulse waveforms in time and relies on the OFDM tone modulation to provide orthogonality. SC-OFDM is a pulse-shaped OFDM that uses shaped waveforms in time to roll-off the spectrum of the waveform between adjacent channels to provide orthogonality, allows the user to occupy subbands of differing widths, and uses a different tone spacing, data packet length, and sub-frame length compared to OFDM for WiFi, WiMax. In addition to these applications the symbol modulations 4PSK, 16QAM, 64QAM, 256QAM are used for satellite, terrestrial, optical, and all other communication links and with maximum data symbol rates achieved using 256QAM.

SUMMARY OF THE INVENTION

This invention introduces a co-state maximum a-posteriori MAP demodulation architecture and implementation of a quadrature layered modulation QLM for OFDM and SC-OFDM modulations to provide a method for increasing the data rates and with applicability to all communications. QLM for OFDM WiFi provides a method for increasing the data rates to 2-3× WiFi maximum data rate with current technology and to 4-5× WiFi maximum data rate with technology advances. Performance estimates are from the plots of bit rate b in Bps/Hz vs. $E_b/N_o$ and S/N=C/I for the ML symbol demodulation and wherein C/I is the carrier to interference power ratio, MAP trellis demodulation, QLM and Shannon bounds, and for the reference 4PSK, 8PSK, 16QAM, 64QAM, 256QAM, 4096QAM data symbol modulations. Measured simulation data supporting these plots is disclosed for 4PSK with $n_p$=1-6 layers and 256QAM for $n_p$=1-8 layers and wherein PSK is phase shift keying data symbol modulation and QAM is quadrature amplitude data symbol modulation. QLM provides similar increases in data rate for OFDM WiMax and OFDM and SC-OFDM LTE. QLM supports data symbol rates that can be multiples of the Nyquist rate and communications data rates that can be multiples of the Shannon bound. For MIMO the QLM provides similar increases in the data rates.

MAP trellis demodulation algorithms are disclosed which are at least as good as maximum likelihood ML trellis demodulation algorithms. MAP algorithms enable the number of trellis paths to be reduced which becomes a critical property to support both higher order data symbols such as 16-256QAM and larger number $n_p$=2-4 of QLM communications layers and a second important property is that performance is at least as good as ML algorithms. Co-state refers to the substitution of the co-state "xi" for the MAP algorithm in place of the state "jx" in the ML algorithm to find the best path jxi from the previous state to the current state wherein jxi reads from left to right with "j" the current data symbol, "x" the intermediate data symbols, and "i" being the last data symbol. MAP trellis algorithms are developed in detail for implementation in a communications receiver for data symbol demodulation, word sliced demodulation, reduced path demodulation, and iterative versions which accommodate sidelobes with modest increases in complexity. For the highest order modulation 256QAM the symbol trellis demodulation supports QLM layering to $n_p$=2 layers, ½-word word sliced demodulation supports $n_p$=2-3 layers, and reduced path demodulation supports $n_p$≥2-4 layers, with reasonable computational complexity.

Representative QLM OFDM and QLM SC-OFDM architectures are disclosed for implementation of QLM transmitters and receivers using frequency offset as the differentiating parameter for QLM OFDM and using time offset as the differentiating parameter for QLM SC-OFDM, and implementing the QLM demodulation with ML trellis or MAP trellis algorithms. Frequency layering for QLM OFDM transmits the QLM layers as frequency offset $FFT^{-1}$ waveforms which are layered over the reference inverse FFT waveform $FFT^{-1}$ which implements OFDM. For SC-OFDM for LTE the time layering transmits the QLM layers as SC-OFDM waveforms which are offset in time compared to the original SC-OFDM waveform.

A representative MIMO cellular communications link architecture using QLM with MAP trellis demodulation is disclosed in this invention for the transmit and receive signal processing algorithms and supporting block diagrams are developed to illustrate the architecture and implementation,

BRIEF DESCRIPTION OF THE DRAWINGS AND THE PERFORMANCE DATA

The above-mentioned and other features, objects, design algorithms, and performance advantages of the present invention will become more apparent from the detailed description set forth below when taken in conjunction with the drawings wherein like reference characters and numerals denote like elements, and in which:

FIG. 1 describes the OFDM waveform for the WiFi standard.

FIG. 2 describes how to increase the data rate using a pulse waveform.

FIG. 3 describes how QLM increases the data rate for a pulse waveform at a constant frequency bandwidth.

FIG. 4 presents the equations for the communications capacity predicted by the new bound, the new Nyquist data symbol rate, and the $BT_s$ product for a Wavelet waveform.

FIG. 5 calculates the ideal time pulse correlation, candidate waveform ψ time response, and the ψ correlation in time.

FIG. 6 calculates the ideal frequency pulse correlation, DFT waveform frequency response, and the DFT correlation in frequency.

FIG. 7 compares the trellis search paths jxi for the ML trellis algorithm and the MAP trellis algorithm.

FIG. 8 compares the Matlab code for selecting the best trellis path jxi for the ML trellis algorithm and the MAP trellis algorithm.

FIG. 12 calculates the approximate range in the number of trellis states required to execute MAP trellis demodulation for $n_p$=2, 3, 4 layers of QLM communications using the full trellis, ½-word trellis, and the reduced path trellis algorithms.

Figure 13A:
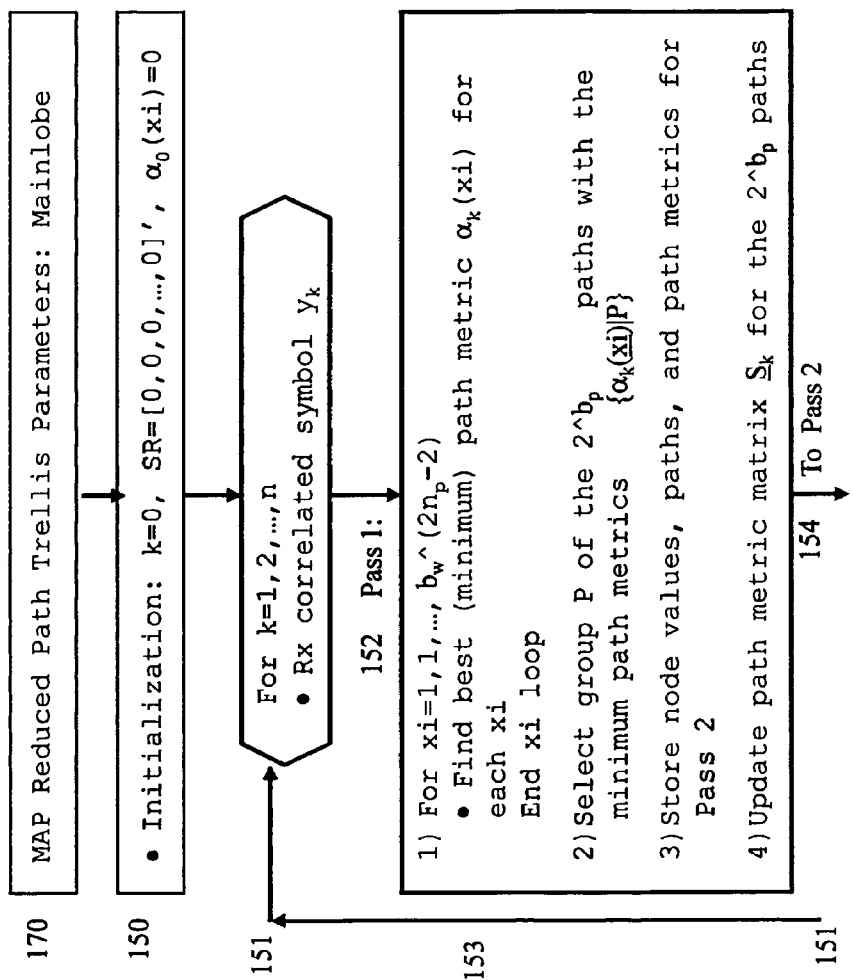

FIG. 13A is a flow diagram of a MAP reduced path trellis demodulation algorithm.

Figure 13B:
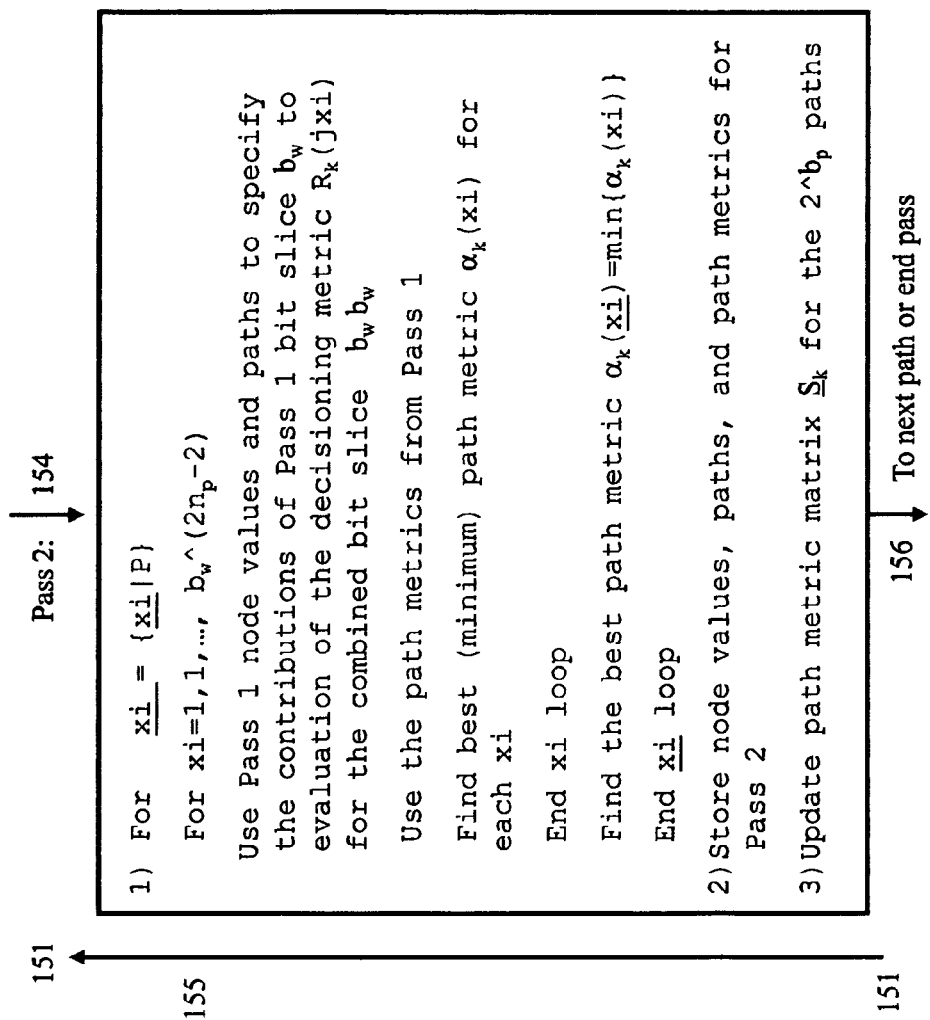

FIG. 13B is a continuation of the flow diagram of the MAP reduced path trellis demodulation algorithm.

Figure 13C:
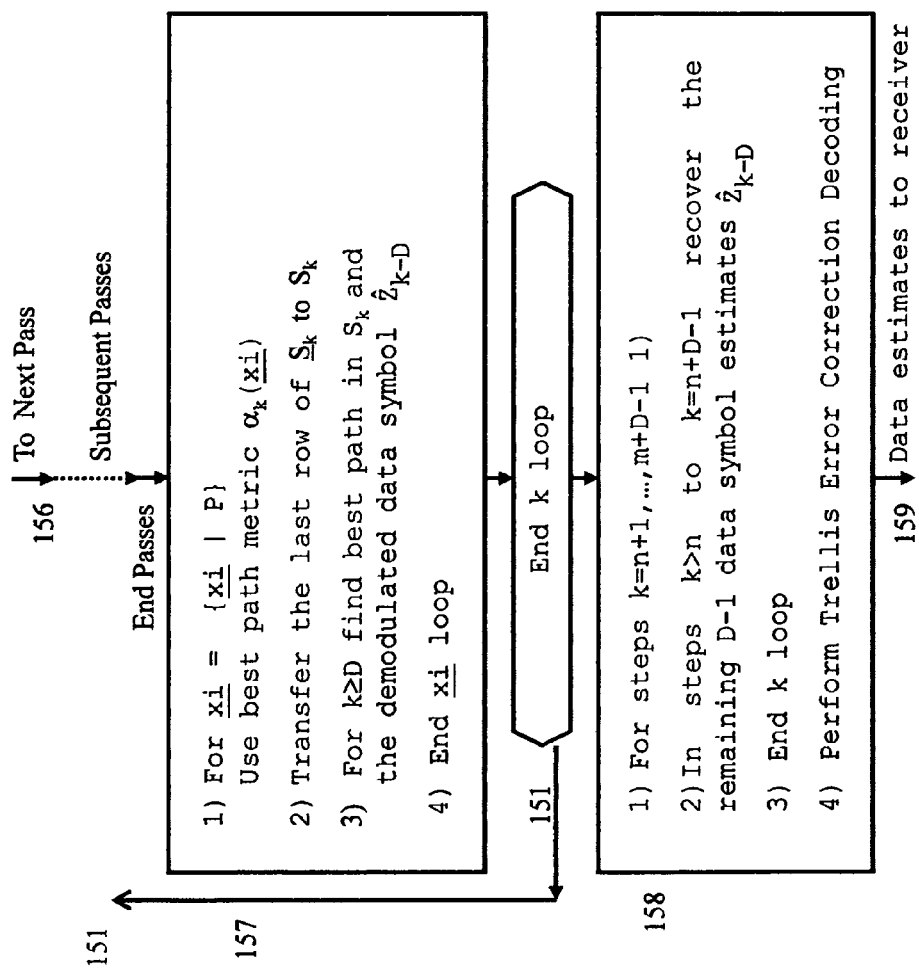

FIG. 13C is a the continuation of the flow diagram of the MAP reduced path trellis demodulation algorithm.

Figure 13D:
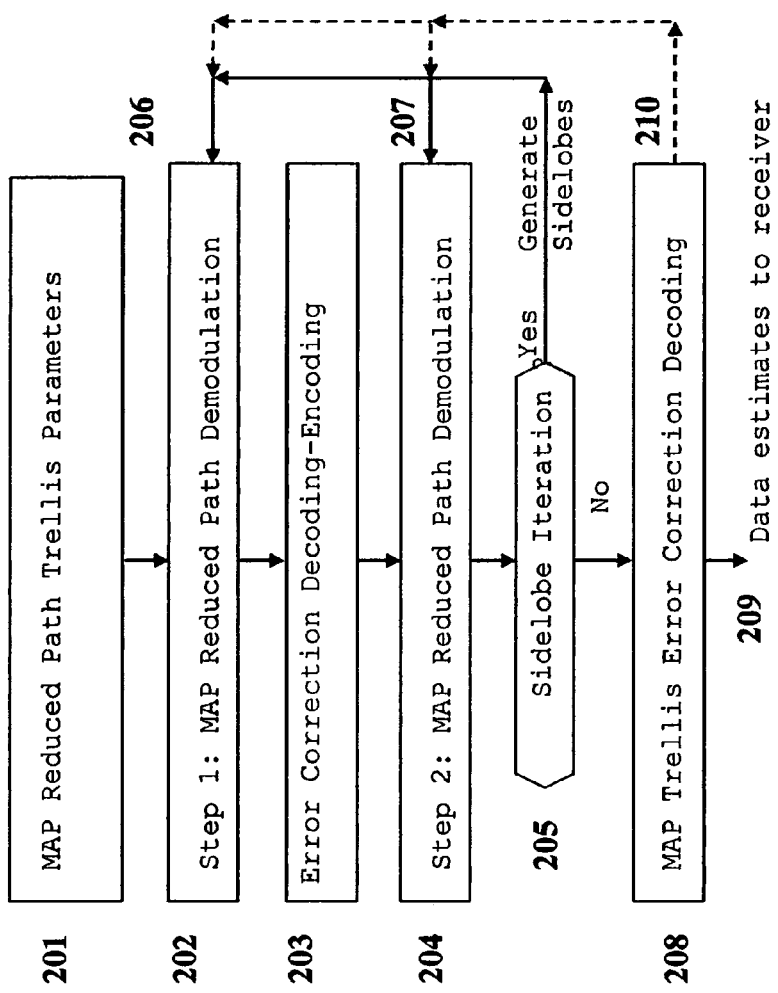

FIG. 13D is a continuation of the flow diagram of the MAP reduced path trellis demodulation algorithm.

Figure 14:
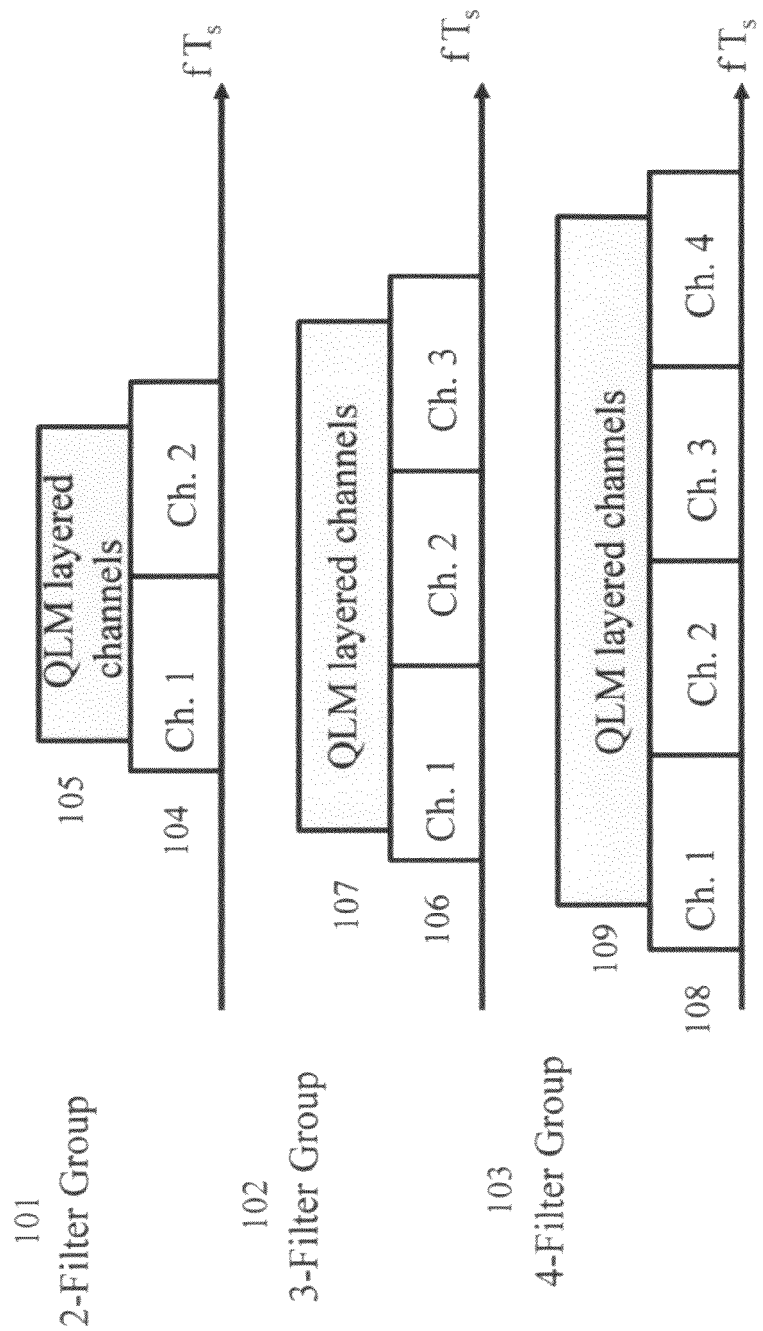

FIG. 14 describes the QLM ML $n_s=2, 3, 4$ data symbol groups.

Figure 15:
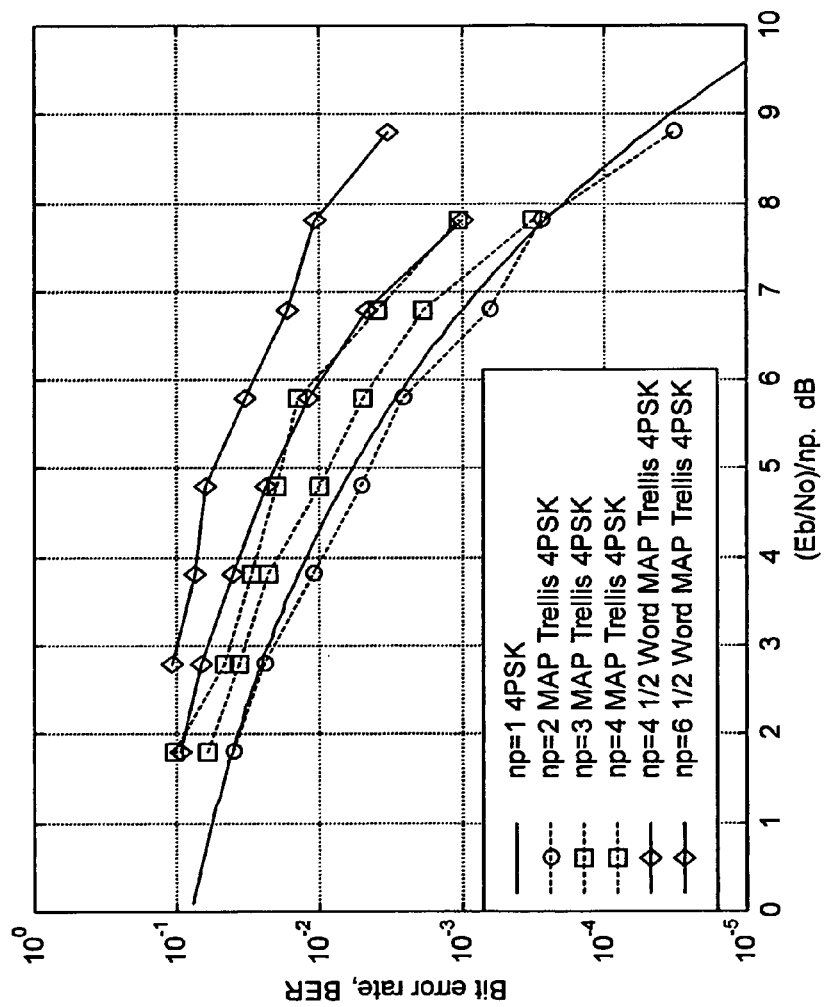

FIG. 15 presents the measured BER performance vs. the QLM scaled $(E_b/N_o)/n_p$ for a pulse waveform with 4PSK modulation for QLM layers $n_p=1, 2, 3, 4$ using a trellis symbol demodulation and for $n_p=4, 6$ using a ½-word trellis demodulation.

Figure 16:
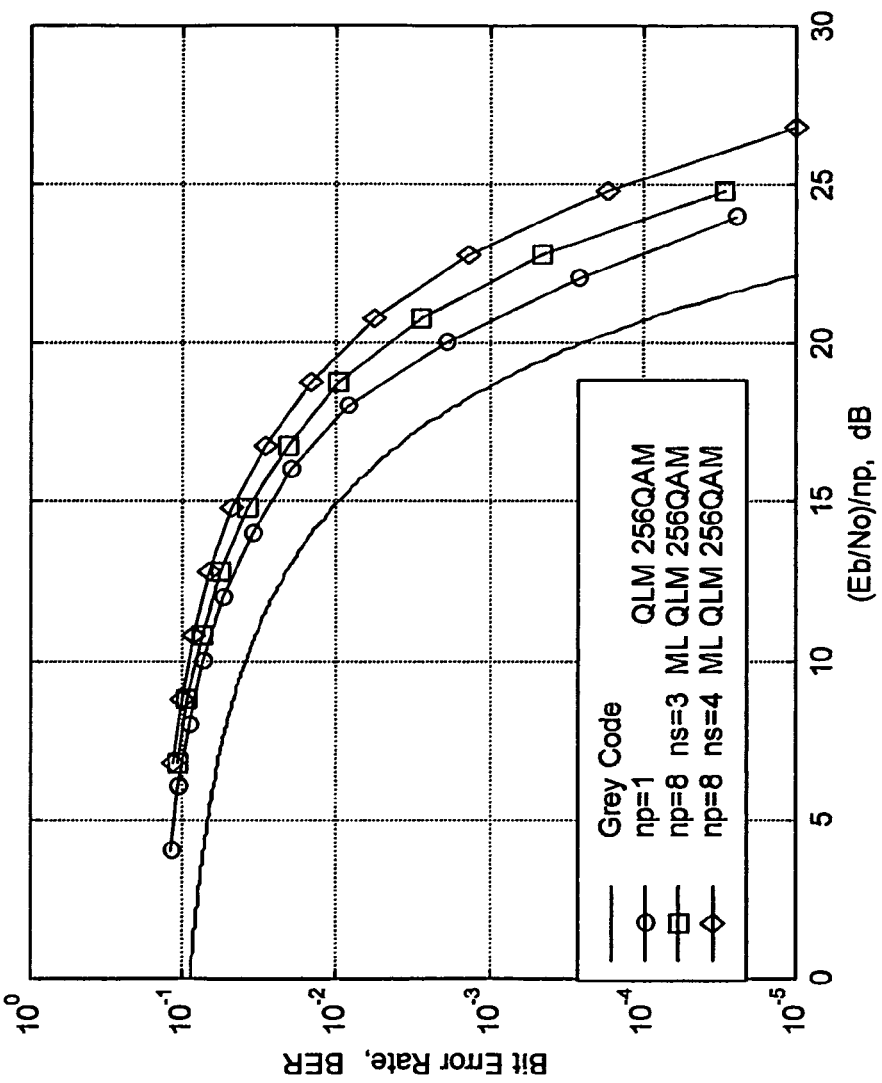

FIG. 16 presents the measured BER performance vs. the QLM scaled $(E_b/N_o)/n_p$ for a pulse waveform with 256QAM modulation for QLM layers $n_p=1, 8$ using $n_s=3, 4$ ML data symbol groups, and for a Grey coded 256QAM performance bound.

Figure 17:
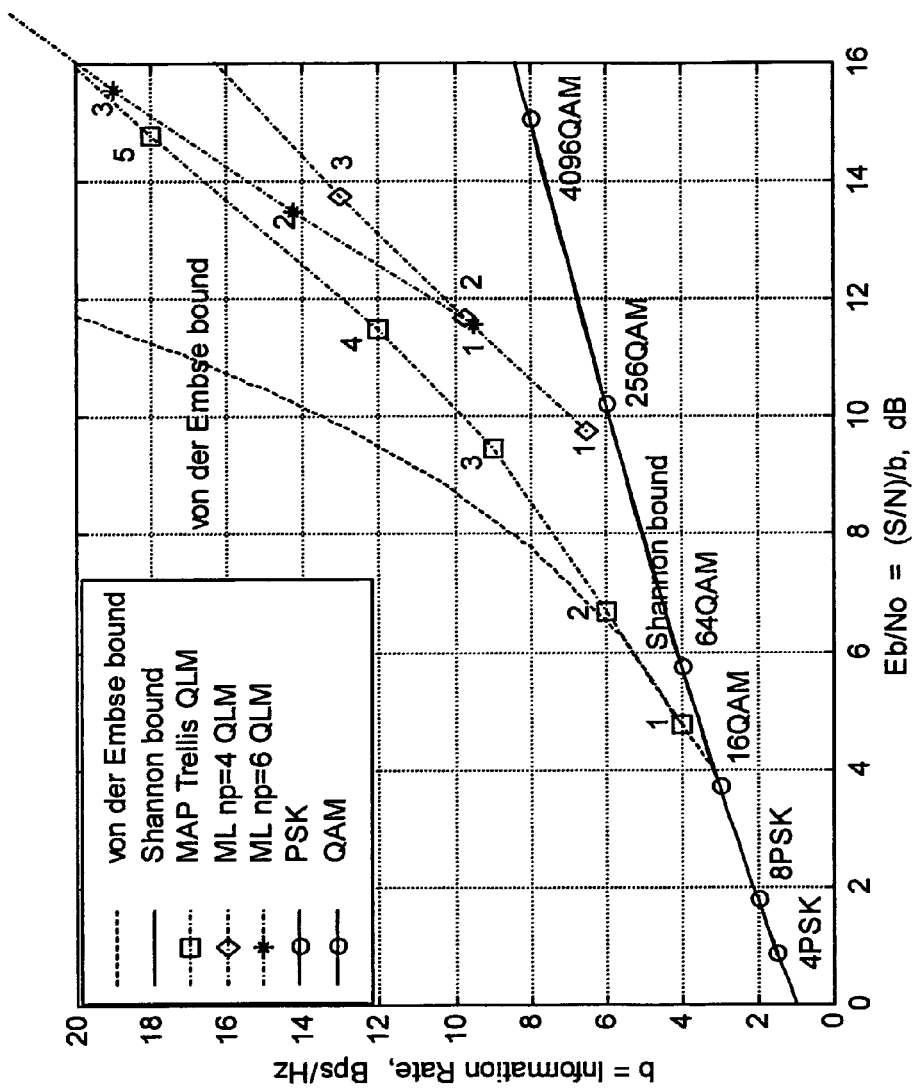

FIG. 17 calculates the information bits b per symbol interval equivalently expressed as Bps/Hz versus $E_b/N_o$ for the new bound, Shannon bound, for PSK and QAM with turbo coding to bring the performance to essentially equal to the Shannon bound, for QLM MAP trellis demodulation parameters in FIG. 19, and for QLM ML demodulation parameters in FIG. 19.

Figure 18:
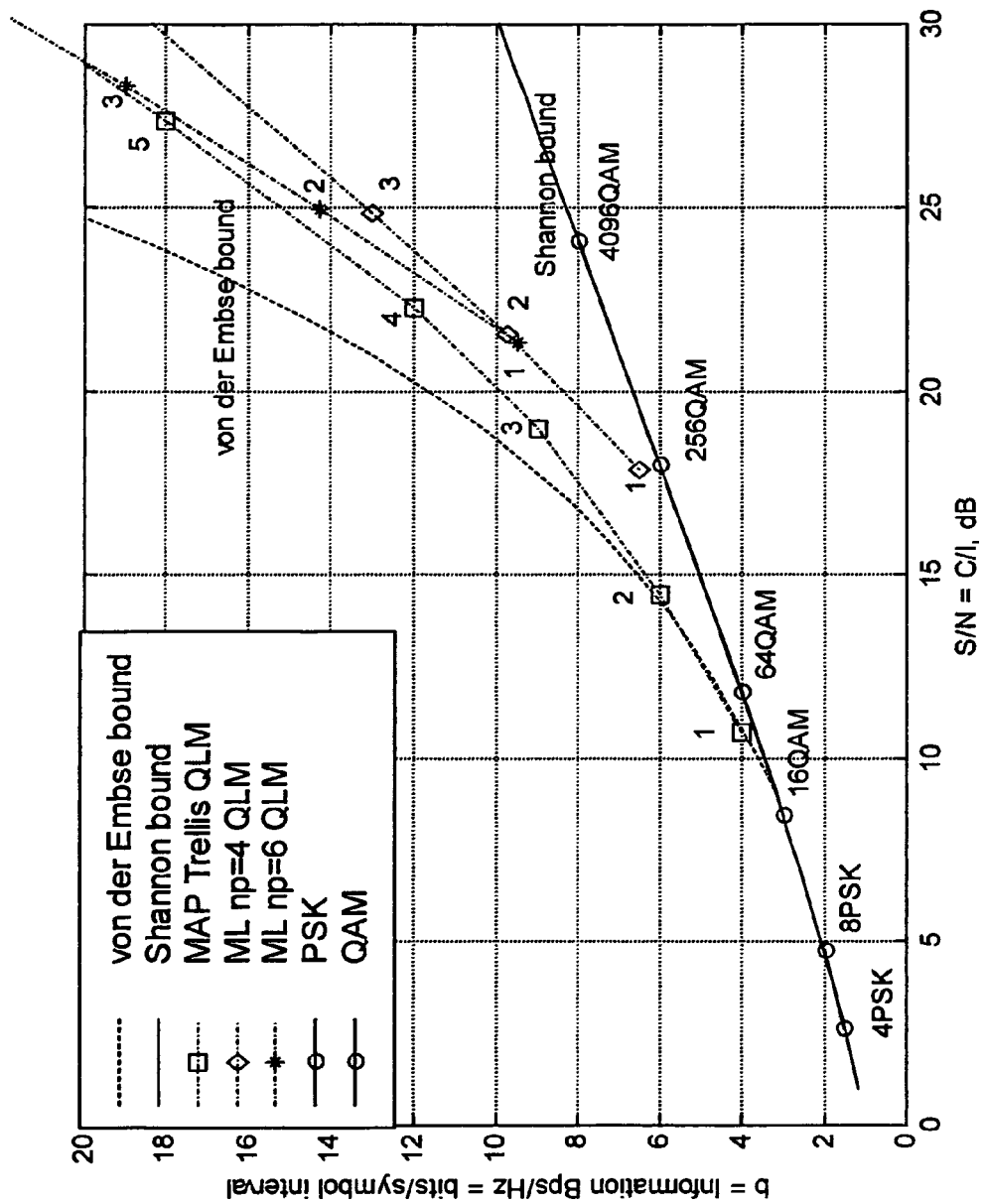

FIG. 18 calculates the information bits b per symbol interval equivalently expressed as Bps/Hz versus S/N=C/I for the new bound, Shannon bound, for PSK and QAM with turbo coding to bring the performance to essentially equal to the Shannon bound, for QLM MAP trellis demodulation parameters in FIG. 19, and for QLM ML demodulation parameters in FIG. 19.

FIG. 19 lists the MAP trellis and ML demodulation parameters used to calculate the performance expressed as b Bps/Hz vs. the $E_b/N_o$ in FIG. 17 and S/N=C/I in FIG. 18.

Figure 20:
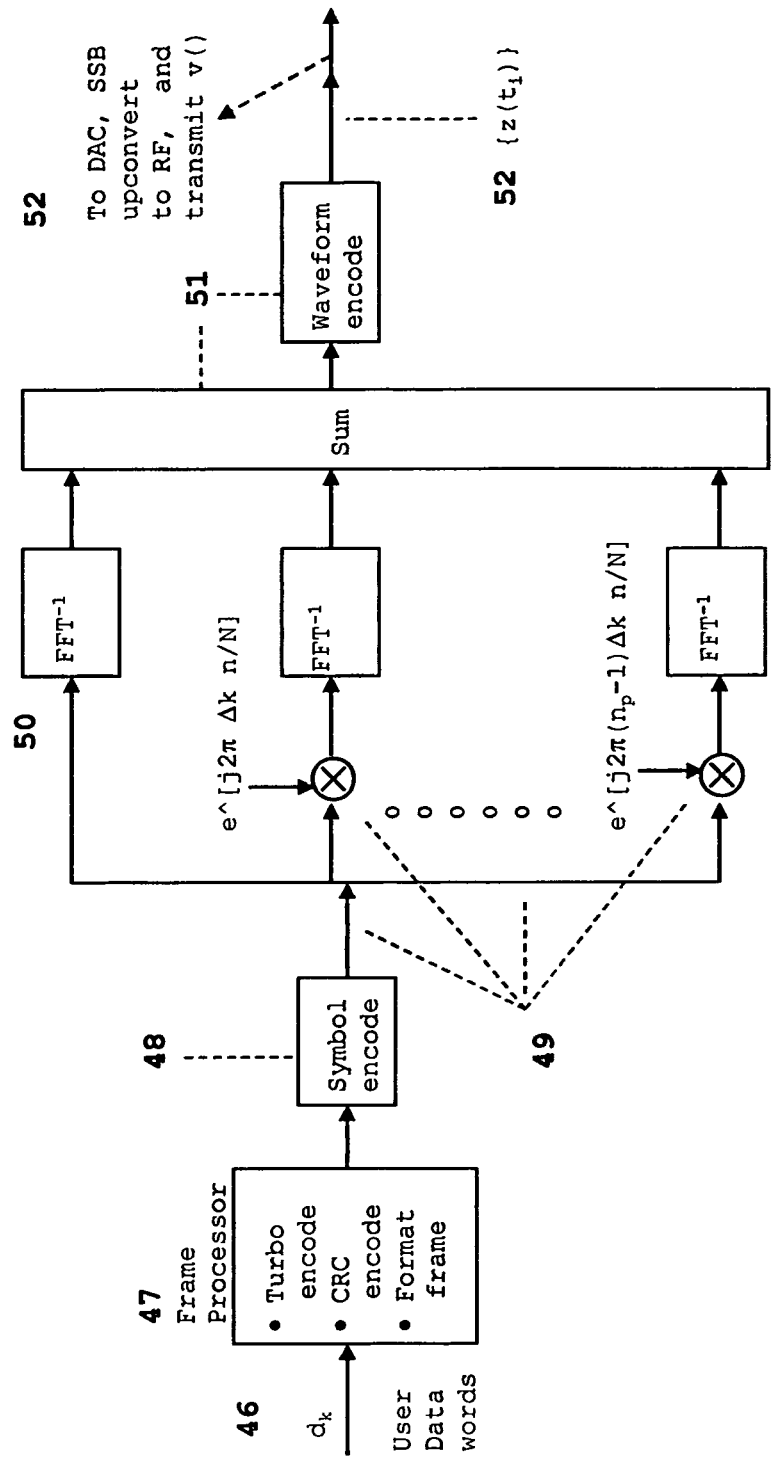

FIG. 20 is a representative transmitter implementation block diagram for QLM OFDM.

Figure 21:
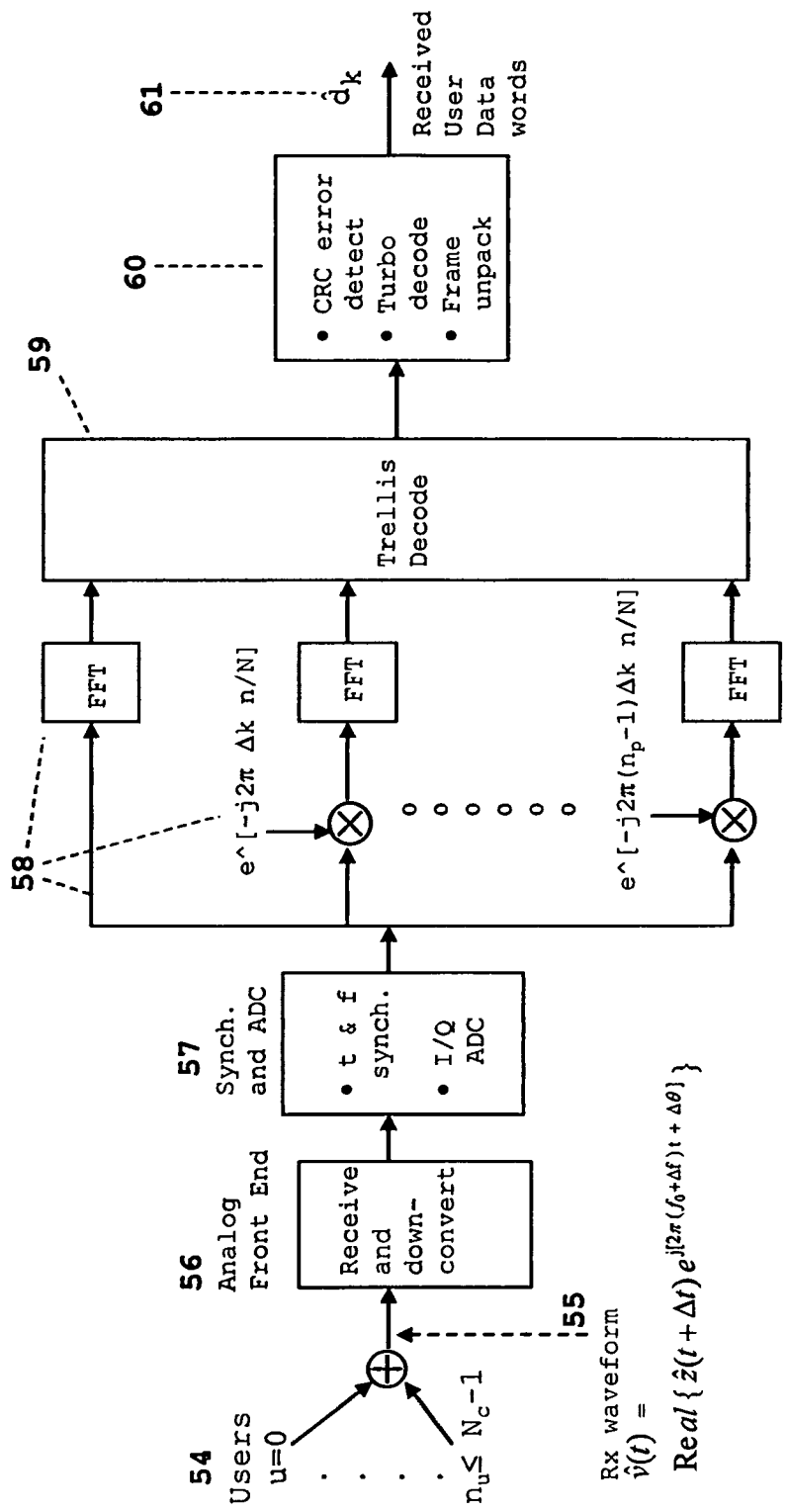

FIG. 21 is a representative receiver implementation block diagram for QLM OFDM.

Figure 22:
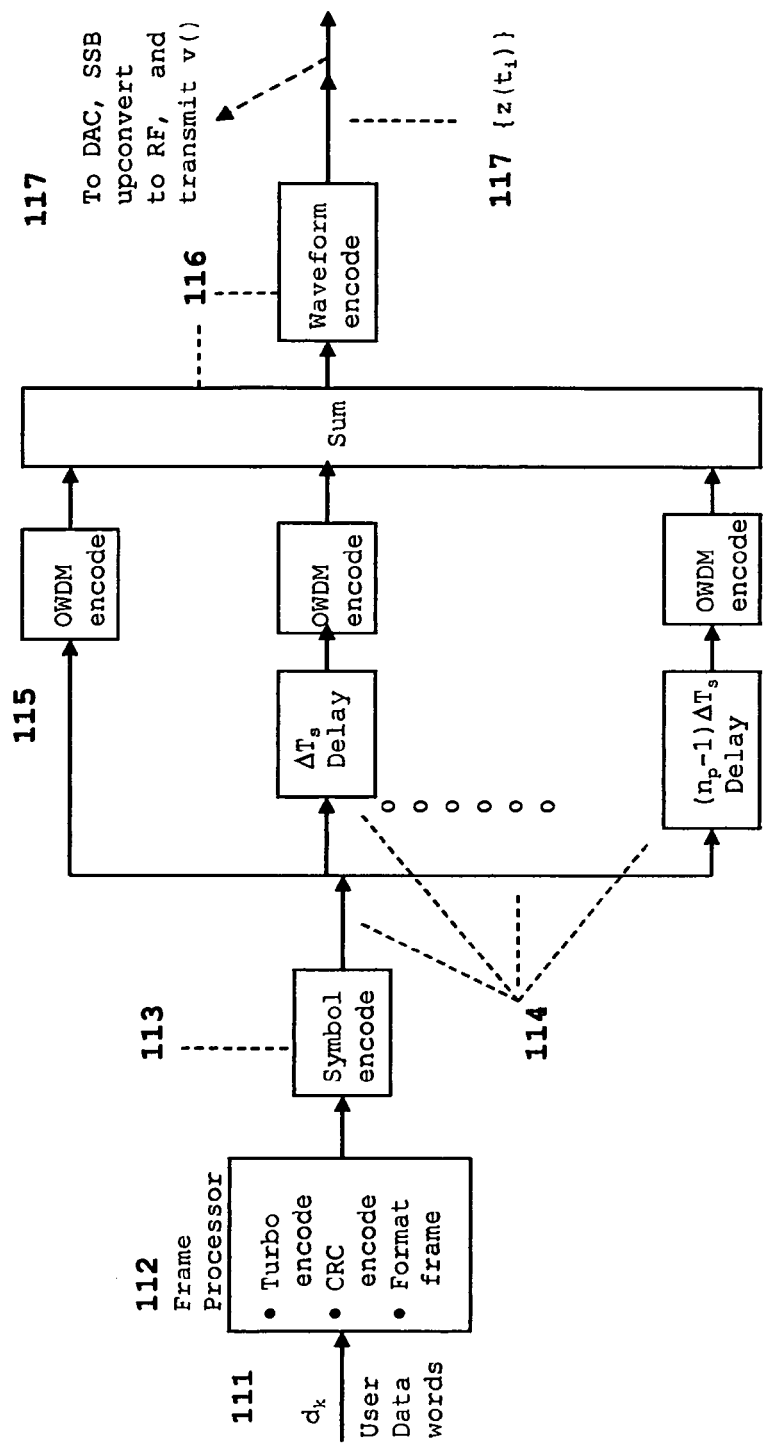

FIG. 22 is a representative transmitter implementation block diagram for QLM LTE.

Figure 23:
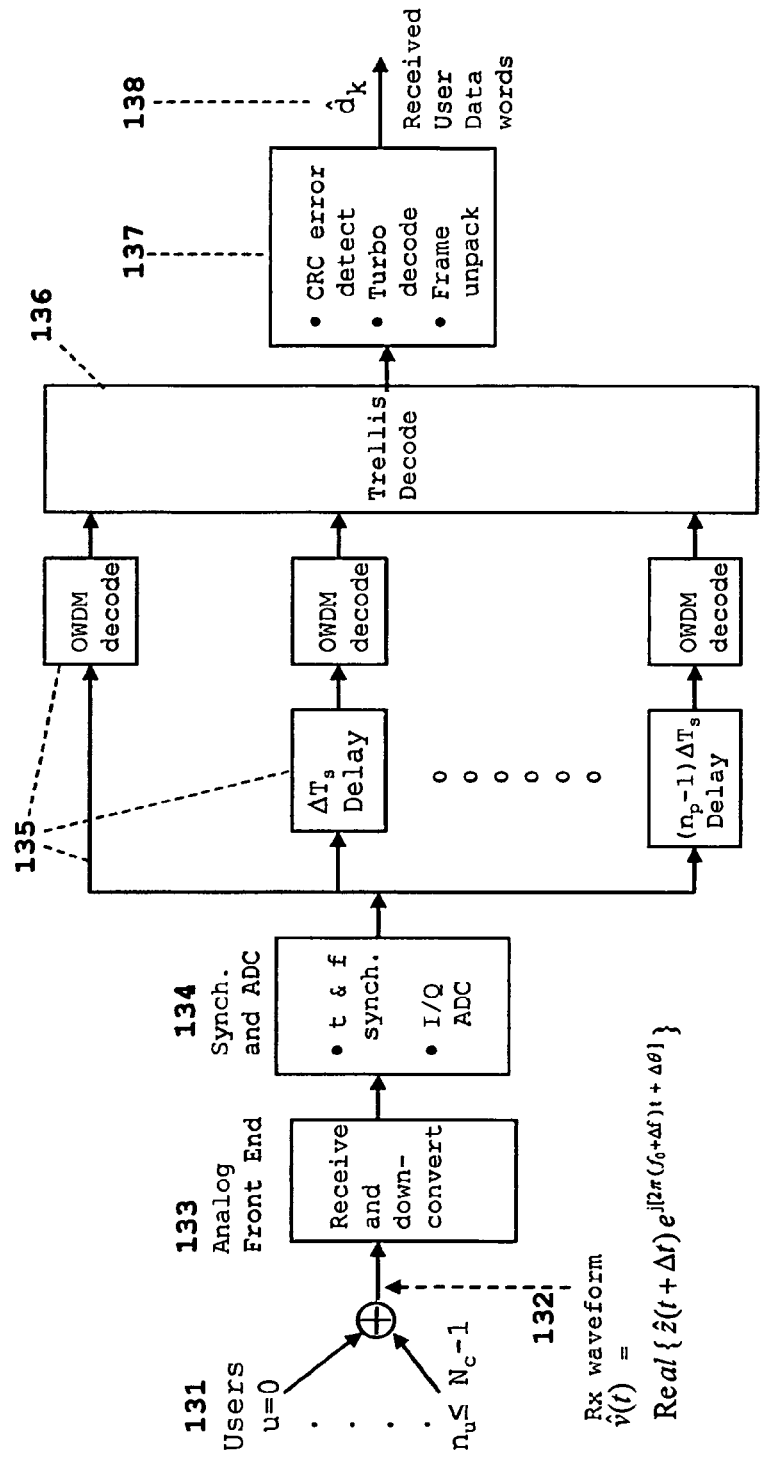

FIG. 23 is a representative receiver implementation block diagram for QLM LTE.

Figure 24:
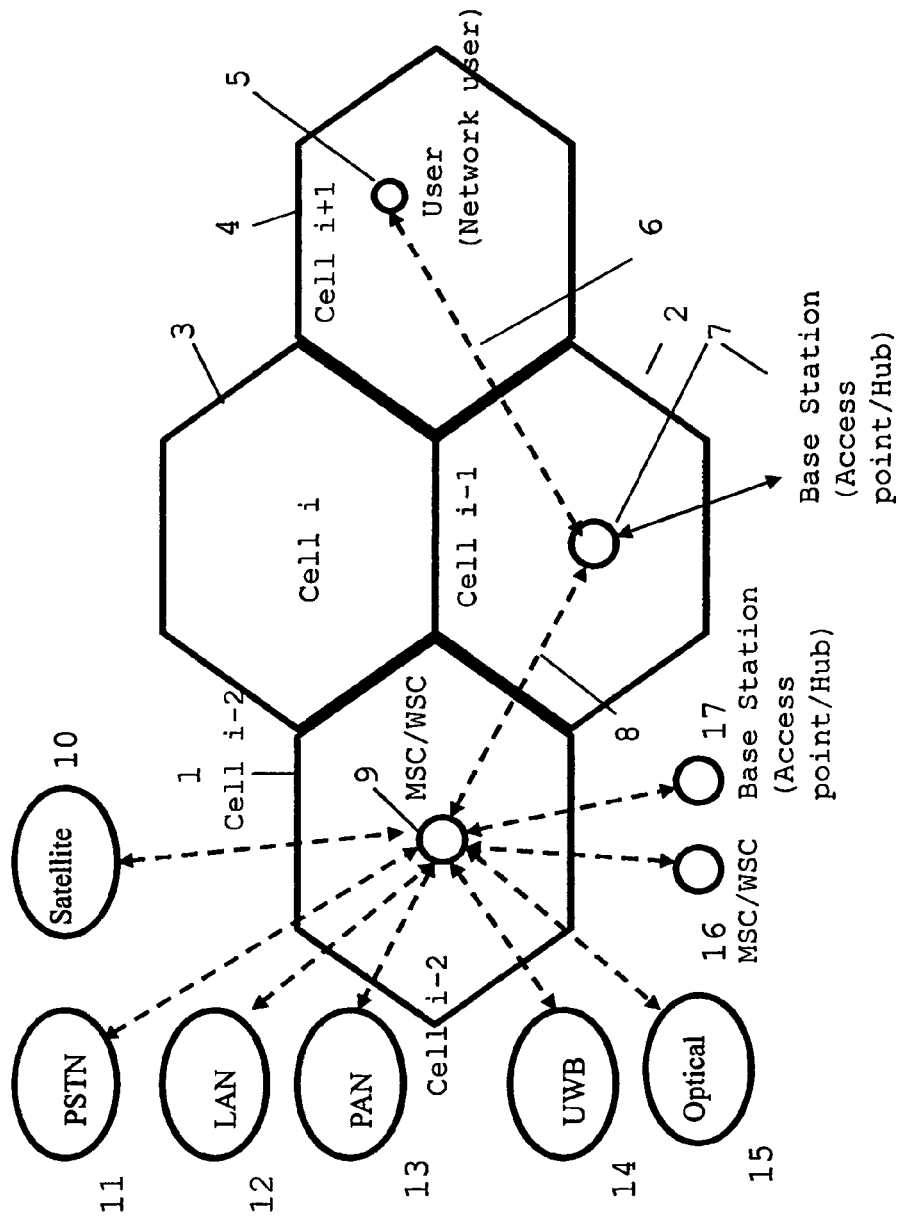

FIG. 24 is a schematic cellular network with the communications link between a base station and one of the users.

Figure 25:
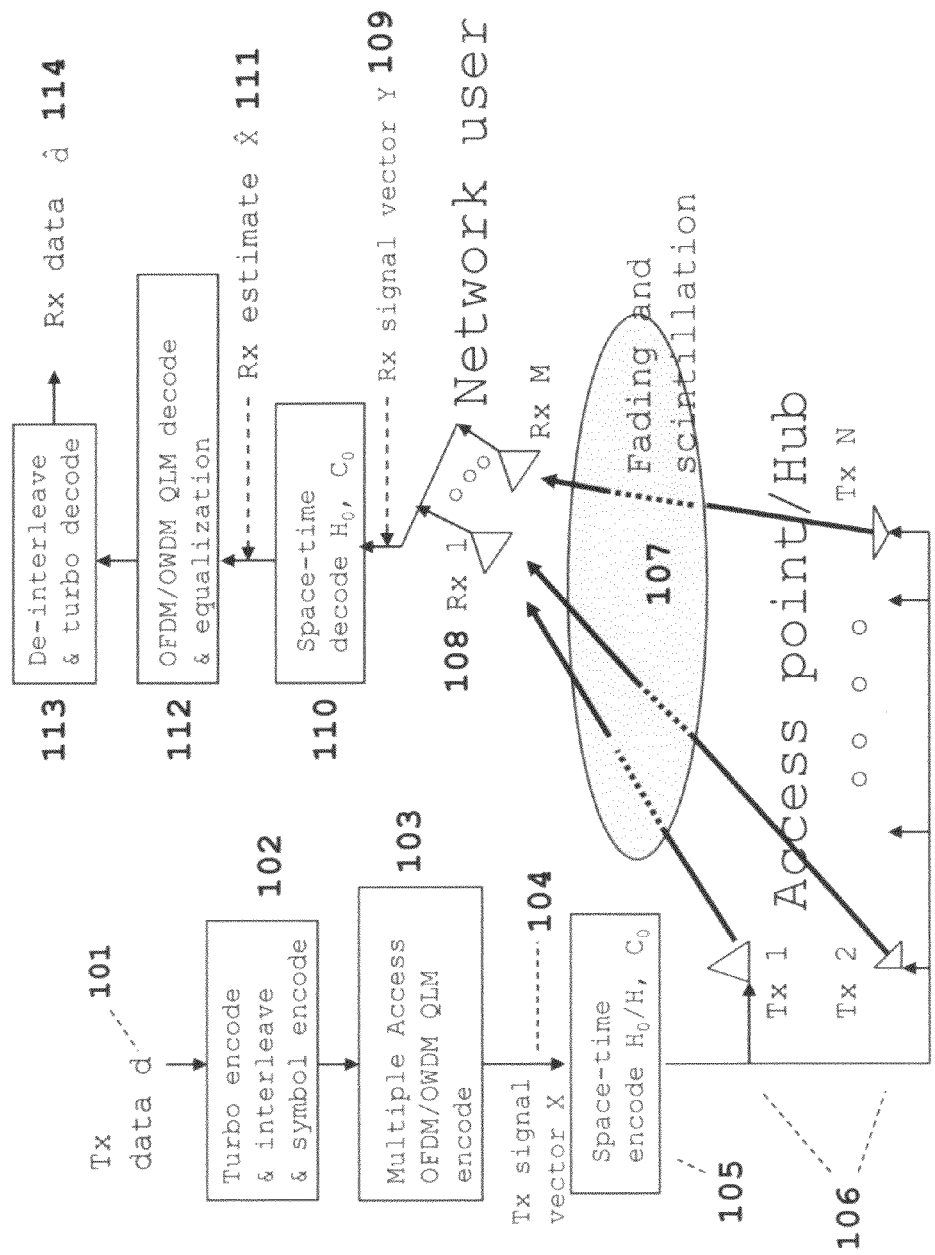

FIG. 25 is a representative architecture of this invention disclosure for MIMO systems for application to the communications link in FIG. 24.

DETAILED DESCRIPTION OF THE INVENTION

OFDM and SC-OFDM applications of quadrature layered modulation QLM in this invention disclosure are illustrated by WiFi and WiMax which uses OFDM on both uplinks and downlinks between the user and base station for cellular communications as well as for communications with satellites, and by LTE which uses OFDM on the downlink and SC-OFDM on the uplink. QLM OFDM adds layers of the OFDM orthogonal data symbol tones at frequency offsets and QLM SC-OFDM adds layers of data symbol tones at timing offsets.

Figure 2:
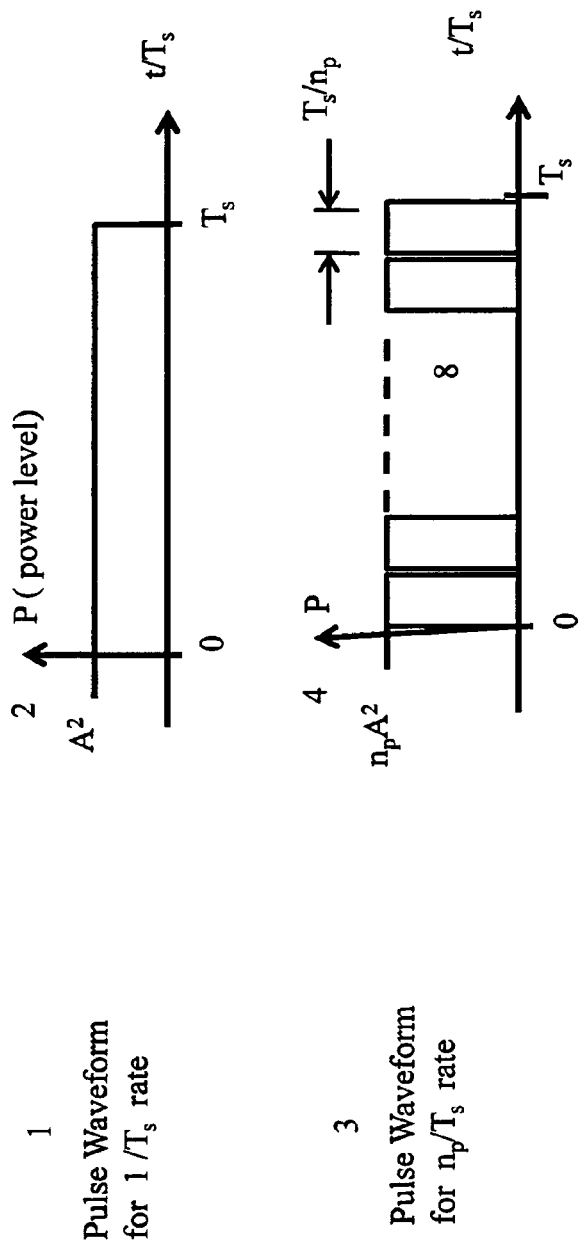

FIG. 2 introduces QLM by considering an ideal pulse waveform in the time domain. In 1 the pulse waveform is transmitted at the data symbol rate equal to $1/T_s=B$ where $T_s$ is the pulse length, B is the bandwidth, the signal power level 2 is $P=A^2$ where "A" is the signal amplitude, and the pulse modulation is phase shift keying PSK with "b" information bits per data symbol. To increase the data symbol rate to $n_p/T_s$ and the information rate to $n_p b/T_s$ the pulse waveform is shortened 3 to $T_s/n_p$ which increases the bandwidth to $n_p B$ wherein $B=1/T_s$ and requires the transmitted power to be increased 4 to $P=n_p A^2$ in order to keep the same pulse energy per bit 5 is $E_b=A^2 T_s/b$. The corresponding energy-per-bit to noise power ratio 6 is $E_b/N_o=A^2/2\sigma^2 b$ where 7 $N_o=2\sigma^2 T_s$ is the noise power density and $2\sigma^2$ is the "mean square" level of communication noise.

Figure 3:
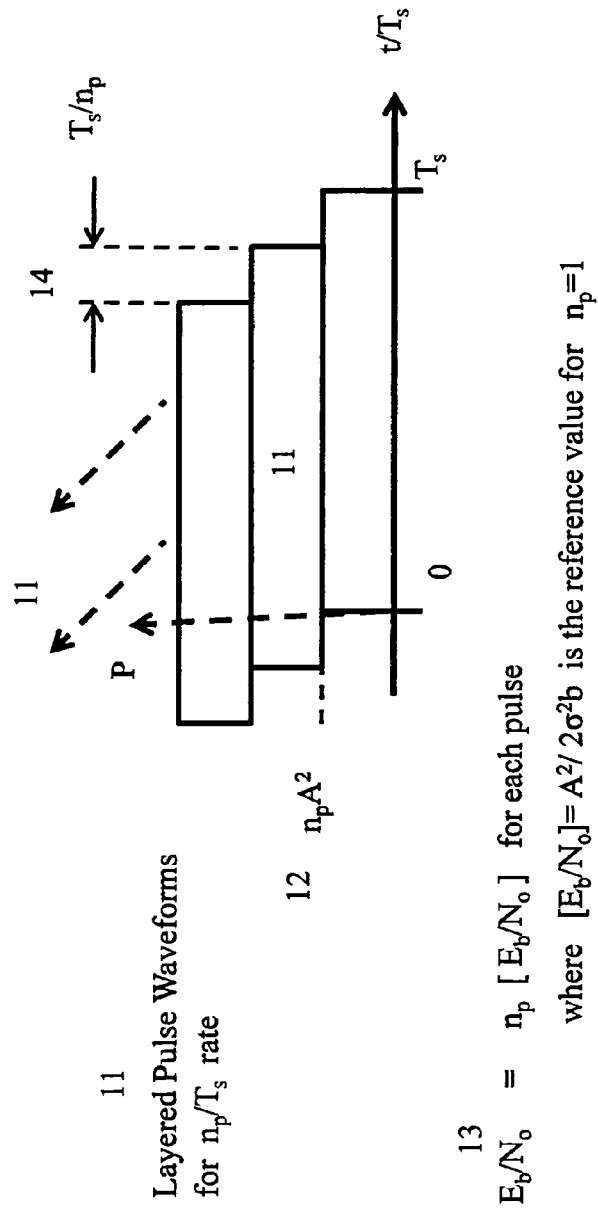

FIG. 3 implements this increase in the data symbol rate using QLM communications without changing the bandwidth of the pulse waveform by extending the pulses 8 in FIG. 2 over the original pulse length $T_s$ and layering these extended data symbol waveforms on top of each other 11 while occupying the same bandwidth $B=1/T_s$. The pulse waveforms in each layer 13 have $E_b/N_o$ values equal to $n_p$ times the original $E_b/N_o=A^2/2\sigma^2 b$ due to the stretching of each pulse over $T_s$ without changing the power level of the pulse. The layers are time synchronized for transmission at $\Delta T_s=T_s/n_p, 2\Delta T_s, \ldots, (n_p-1)\Delta T_s$ offsets 14 respectively for layers $2, 3, \ldots, (n_p-1)$ relative to the $1^{st}$ layer at zero offset. This means the signal-to-noise power S/N over $B=1/T_s$ is equal to $n_p\hat{\ }2$ times the original S/N due to the addition of the $n_p$ pulse power levels 12 over each $T_s$ interval and the scaling of $E_b/N_o$ by $n_p$. This scaling of $E_b/N_o$ in each of the layered communications channels is summarized in equation (3) along with the corresponding scaling of the S/N over $T_s$. We find $$E_b/N_o = n_p[E_b/N_o] \text{ for each layer or channel} \quad (3)$$
$$= n_p[A^2/2\sigma^2 b]$$
$$S/N = \sum n_p E_b/N_o \text{ over } n_p \text{ layers or channels}$$
$$= n_p\hat{\ }2[S/N]$$

wherein ["o"] is the value of "o" for the communications channel when there is no layering.

FIG. 3 describes the layering of the communications channels for QLM and equation (3) defines the QLM scaling of the $E_b/N_o$ and S/N. QLM is a layered topology for transmitting higher data rates than possible with each layer of communications and is implemented by transmitting each layer with a differentiating parameter which enables separation and decoding of each layer. Each layer or channel has a unique differentiating parameter such as time offset as in FIG. 3 and/or frequency offset. Each layer or channel obeys Shannon's laws when using QLM scaling in equations (3).

The equations for the non-optimized channel capacity in Bps and information bits b per symbol interval are the Shannon's bounds in 1, 2 in equation (2) with the maximum "max" removed, with the [S/N] scaling in equations (3), and with the multiplication by "$n_p$" to account for the $n_p$ layers. We find $$C=n_p B \log_2[1+(S/N)/n_p\hat{\ }2] \text{ Bps}$$

$$b=n_p \log_2[1+(S/N)/n_p\hat{\ }2] \text{ Bps/Hz=Bits/symbol interval} \quad (4)$$

using the definition b=C/B in Bps/Hz=Bits/symbol from 2 in equations (2) and observing that "Bits/symbol" in 2 is "Bits/symbol interval" for QLM and wherein it is understood that the C, b are non-optimized values with respect to the selection of the $n_p$.

New upper bounds on C, b, $\eta$ and a new lower bound on $E_b/N_o$ are derived in equations (5) by using equation (4) and equation (2). We find New Capacity Bounds and Coding Theorem 1 $C=\max\{n_p B \log_2[1+(S/N)/n_p\hat{\ }2]\}$ $$2 \max\{b\} = \max\{n_p \log_2[1+(S/N)/n_p\hat{\ }2]\}$$
$$= \max\{n_p \log_2[1+(b E_b/N_o)/n_p\hat{\ }2]\}$$
$$= \max\{\eta\}$$

3 $\min\{E_b/N_o\} = \min\{[n_p{}^2/b][2^b]/n_p - 1\}$

4. New coding theorem

For $R_b < C$ there exists codes which support reliable communications

For $R_b > C$ there are no codes which support reliable communications

5. New symbol rate $n_p/T_s$ $\max\{n_p/T_s\} = n_p B$ for $n_p$ layers of communications $= n_p \times$ (Nyquist rate for 1 channel)

wherein the maximum values of C, max{b}, and max{η} of C, b, η are the respective maximums of the expressions in equation (4) with respect to $n_p$, the units of C, b, η are Bps, information bits/symbol interval, and Bps/Hz which means b is expressed in units Bps/Hz as well as in units of information bits/symbol interval, and the min{$E_b/N_o$} is the minimum of $E_b/N_o$ with respect to $n_p$ similar to the derivation in 2 in equations (2).

The new coding theorem in 4 in equations (5) states that C is the upper bound on the information data rate $R_b$ in bits/second for which error correcting codes exist to provide reliable communications with an arbitrarily low bit error rate BER wherein C is defined in 1 in equations (5) and upgrades the Shannon coding theorem 3 in equations (1) using new capacity bound C in 1 in equations (5) and introduces the new data symbol rate 5 whose maximum value max $\{n_p/T_s\}$ is $n_p$ times the Nyquist rate for a single channel.

FIG. 4 restates the new communications bound in U.S. Pat. No. 7,391,819 in a format suitable for implementations. Listed are the new Nyquist rate 25, new bounds on C, b, η in 26, and the assumed bandwidth-time product in 27 with the note that the excess bandwidth α is zero α=0 for a QLM Wavelet waveform from U.S. Pat. No. 7,376,688.

Figure 5:
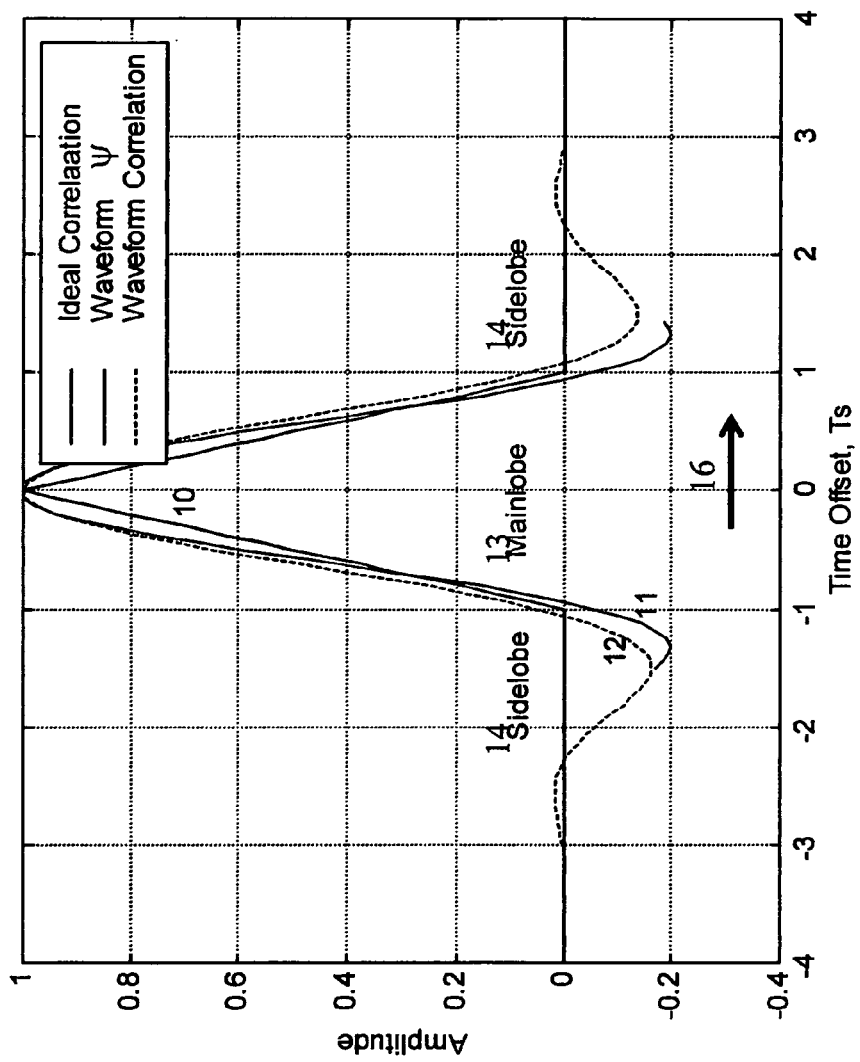

FIG. 5 calculates the ideal triangular correlation 10, an example waveform 11 designated by ψ, and the waveform ψ correlation 12. Parameters of interest for this example square-root raised-cosine waveform are the waveform length L=3, M=16, and excess bandwidth α=0.22, the mainlobe 13 which extends over a $2T_s$ interval, and the sidelobes 14 which fall outside of the mainlobe. Parameter L is the waveform length in units of M=16 samples and M is the number of digital samples between adjacent waveforms at a Nyquist symbol rate=$1/T_s$ for which $T_s$=MT where 1/T is the digital sample rate and α is a measure of the roll-off of the frequency response. The ideal triangular correlation is the correlation for the pulse waveform of length $T_s$ in FIG. 3 and FIG. 5 demonstrates that for waveforms of interest for QLM the triangular correlation approximates the mainlobe correlations for QLM waveforms.

Figure 6:
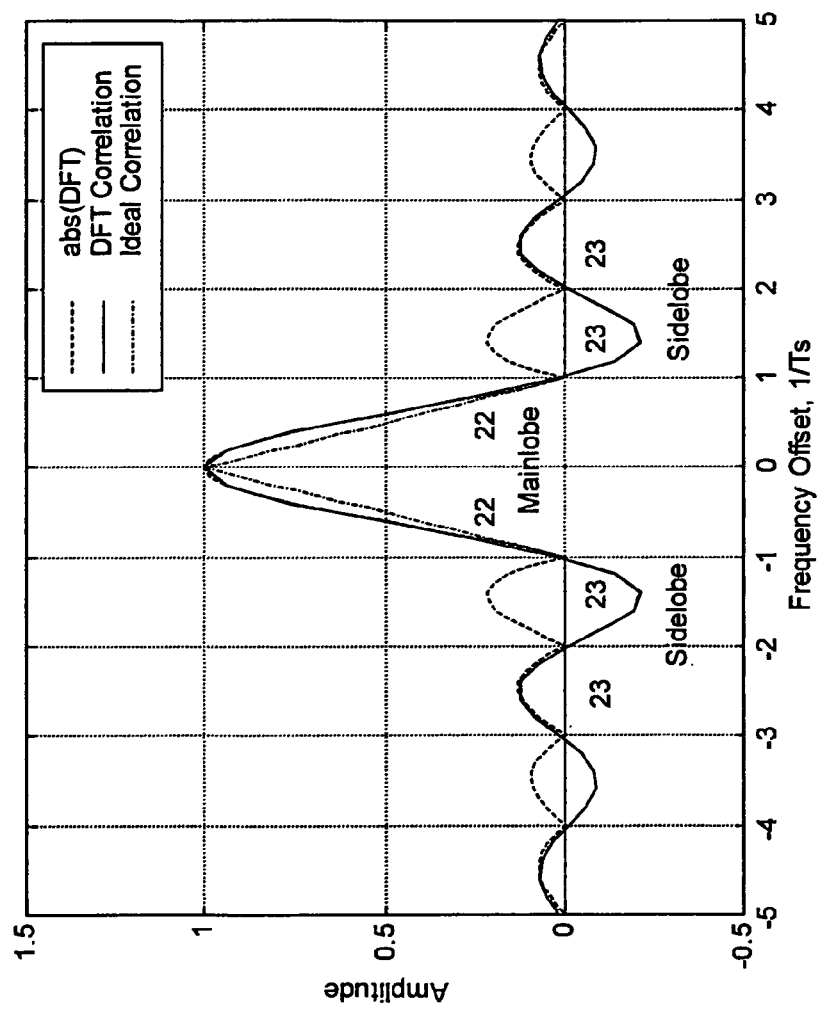

FIG. 6 presents a N=64 point discrete Fourier transform DFT for OFDM in frequency, the correlation function, and an ideal correlation function in frequency for a pulse waveform in frequency. The correlation function closely approximates the waveform and the ideal correlation with a triangular mainlobe, and has a mainlobe 22 extending over $2/T_s$=2B Hz interval with low sidelobes 23 wherein the symbol rate $1/T_s$ is at the Nyquist rate and equal to the bandwidth B for each channel.

QLM demodulation received signal processing synchronizes and removes the received waveform by performing a convolution of the received waveform encoded data symbol with the complex conjugate of this waveform, to detect the correlated data symbols. This convolution is a correlation of the waveform with itself as illustrated in FIG. 5 and FIG. 6 since the waveforms are real and symmetric. QLM demodulation algorithms process the mainlobes of the waveform correlation algorithms in the first pass and pick up the impacts of the sidelobes in subsequent passes. This iterative architecture provides a means to demodulate the stream of overlapping and correlated QLM data symbol waveforms with reasonable computational requirements by processing the mainlobes and including the sidelobes in subsequent iterations. Correlation data in FIG. 5,6 suggest this approach since the sidelobes are relatively low compared to the mainlobes for the bandwidth efficient waveforms being addressed.

QLM demodulation algorithms are categorized as ML and MAP trellis algorithms, ML algorithms, sequential relaxation algorithms, and other algorithms. Sequential relaxation algorithms process the stream of data symbol samples to find the best estimates of the data symbols using sequential relaxation methods. These are computationally intensive and the least developed of the other algorithms.

ML algorithms solve the QLM system equations for the correlated signals to find estimates of the data symbols in each of the QLM layers and are the least complex of the demodulation algorithms, are limited to a relatively few data symbols, and require the waveform correlation functions to approximate the ideal pulse correlations in FIG. 5,6. ML system equations for each set of detected data symbols from the layered (overlapped) channels are defined in equations (7) as a vector equation which calculates the received Rx detected data symbol vector Y as a linear sum of the transmitted Tx data symbol vector X multiplied by the correlation matrix H plus the Rx noise vector N. We find Rx detected data symbol set for QLM channels $Y = HX + N$ (7)

where
Y=n×1 detected symbol vector
H=correlation matrix of data symbols
X=data symbol vector over layered Filters/channels
N=demodulation plus link noise
n=number of QLM channels (filters)

wherein the Rx data symbol vector Y has components $\{Y_i\}$ over the set of channels or filters indexed on "i", Tx data symbol vector X has components $\{X_i\}$ indexed over the same set of channels or filters, and Rx noise vector N has components $\{N_i\}$ indexed over the same set of channels or filters. The ML demodulation algorithm is derived in 4 in equations (8) for the system equations (7). We find ML demodulation algorithm (8)

1 ML Cost $J = [Y - HX]'Q^{-1}[Y - HX]$ $= (-)$ exponent of the ML probability density function 2 ML solution $\hat{x}$ minimizes J $\hat{x} = [H'Q^{-1}H]^{-1}H'Q^{-1}Y$ 3 The noise covariance Q is $Q = E\{N\,N'\}$ $= 2\sigma^2 H$ since the noise is correlated by the same filter overlap as the signal.

This reduces the ML solution 2 to:

4 mL demodulation algorithm $$\hat{x} = H^{-1} Y \qquad (5)$$

wherein H' is the conjugate transpose of H, the inverse $H^{-1}$ exists for all waveforms of interest, and "$2\sigma^2$" is the root-mean-square rms data symbol detection noise.

The ML algorithm for QLM in equations (7),(8) equally applies when using partial symbol ΔT, integration wherein the integration intervals are over the separation between the consecutive layers of communications so that $\Delta T_s = T_s/n_p$. The correlation matrix for a full symbol integration is a symmetric Toeplitz matrix whereas using a $\Delta T_s = T_s/n_p$ integration interval reduces the matrix to a triangular form thereby offering a decrease in computational complexity and a more robust solution since the determinant of the correlation matrix will not become too small with relatively large data packets. However, the requirement to demodulate with a matched waveform makes it extremely difficult to use partial symbol $\Delta T_s$ integration.

Maximum a-posteriori MAP trellis algorithms have the correct architecture for reducing the number of trellis paths to enable higher order modulations to be used for larger numbers of overlapped QLM channels, compared to the maximum likelihood ML trellis algorithms which are derived from the ML trellis algorithms used for convolutional and Turbo decoding. Another critical property disclosed in U.S. Pat. No. 7,337,383 is that the MAP trellis algorithms are at least-as-good-as the ML trellis algorithms.

Figure 7:
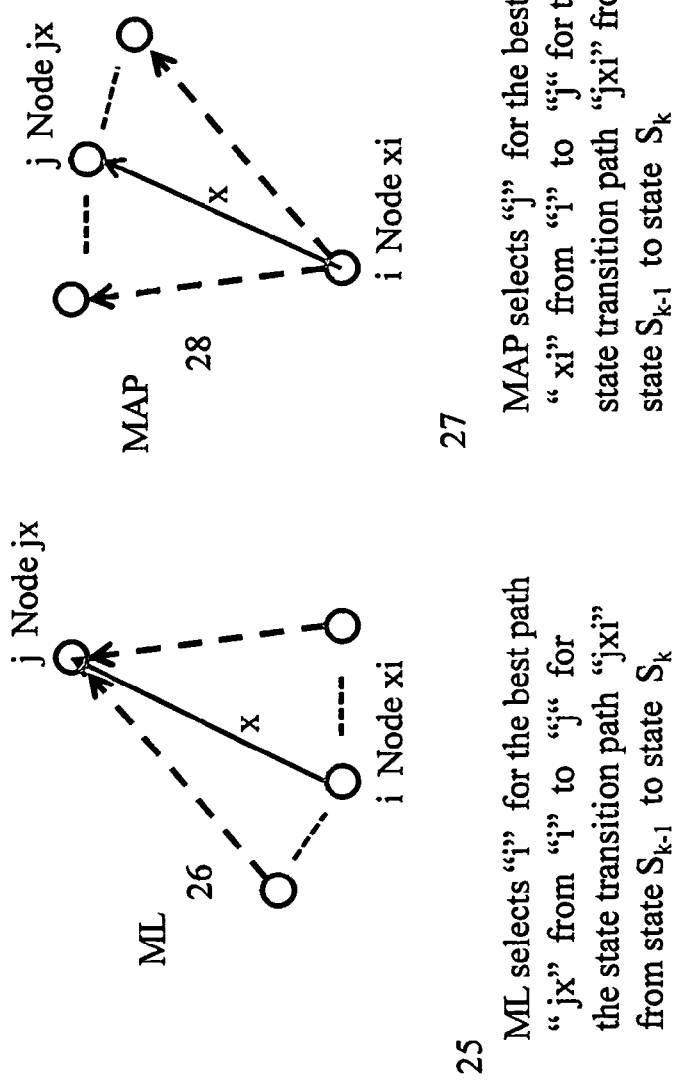

FIG. 7 illustrates the difference between MAP and ML trellis paths jxi going from the previous state $S_{k-1}$ to the current state $S_k$ via the path jxi. Trellis paths progress from the set of nodes defining the previous state $S_{k-1}$ to the set of nodes defining the current state $S_k$. Co-state MAP trellis algorithms are disclosed with the capability to support reduced-path trellis demodulation and with performance which is at least as good as ML trellis algorithms. Co-state refers to the substitution of the co-state "xi" in place of the state "jx" in the path algorithm. Architectures disclosed are symbol, sliced, and reduced-path MAP trellis algorithms. In FIG. 7 data symbols are identified by their indices progressing from the last symbol "i" node ix in the path jxi to the current symbol "j" node jx moving left to right, and with "x" representing the symbols along the path between the end symbols "i" and "j". The transition paths between nodes designated as circles in FIG. 7 encompasses the correlated values of the data symbols over the mainlobe correlation values in FIG. 5,6. For a QLM signal which has $n_p$ simultaneous communications channels, there are $(2*n_c-1)$ correlation values over the mainlobe which means jxi represents the $n_s^{(2*n_p-1)} = 2^{b_s(2*n_c-1)}$ data symbols wherein $n_s = 2^{b_s}$ is the number of states of each data symbol, $b_s$ is the number of uncoded bits, and $n_p$ is the number of QLM overlayed channels. Sidelobe correlations for $n_c > n_p$ are included in iterative MAP trellis demodulation algorithms and wherein $n_c$ is the number of one-sided correlation values including the sidelobes. Correlation states $S_{k-1}, S_k$ specify the node values in the trellis diagram wherein "node" refers to the $n_s^{(2*n_p-2)}$ correlation states for data symbols k−1, k wherein the received data symbols are indexed on k which is the state index and also is the step number. The path jxi is the transitioning path from the previous node xi to the new node jx. As illustrated in FIG. 7 the ML algorithm selects the best path 25 by finding the xi which provides the best transitioning metric jxi from xi to jx from among the possible choices 26 for xi. The MAP algorithm selects the best path 27 by finding the jx which provides the best transitioning jxi from xi to jx from among the possible choices 28 for jx. The MAP is a co-state formulation of the trellis algorithm since it replaces the search over jx with a search over xi thereby enabling the number of paths specified by xi to be reduced along with the number of states in the trellis diagram and the computational complexity and with minimal impact on performance.

MAP and ML trellis algorithms implement the following decisioning rules for updating the state metric $\alpha_k(S_k)$ for each node in the trellis diagram $$\begin{aligned}
\alpha_k(S_k) &= \min\{\alpha_{k-1}(S_{k-1}) + R_k(S_{k-1} \to S_k) = R_k(jxi)\} \qquad (5)\\
&= \text{new metric for state } k
\end{aligned}$$

wherein min is with respect to $i$ for ML min is with respect to $j$ for MAP $$\begin{aligned}
\alpha_k(S_k) &= p(y_k \mid S_k) \quad &&\text{for ML}\\
&= p(S_k \mid y_k) \quad &&\text{for MAP}
\end{aligned}$$

$$\begin{aligned}
R_k(S_{k-1} \to S_k) &= R_k(jxi)\\
&= |y_k - x_k|^2 / 2\sigma^2 \quad &&\text{for a ML metric}\\
&= |x_k|^{\wedge}2 - 2*\text{Re}(y_k x_k)* \quad &&\text{for a MAP metric}
\end{aligned}$$

wherein $(o)^*$ is the complex conjugate of $(o)$, wherein the choice of a "min" or a "max" depends on the definition of R(jxi), the $y_k$ refers to the correlated data symbol measurement at state or step k, the $R_k(S_{k-1} \to S_k) = R_k(jxi)$ is the state k transition decisioning metric for the transition written symbolically as $S_{k-1} \to S_k$ and realized in Matlab notation as "jxi", and unless there is a significant performance impact, the ML or MAP metrics can be used interchangeably.

FIG. 8 lists the Matlab code in a pseudo-code format for the calculation of the best trellis paths in and for the state updates for the ML and MAP trellis algorithms. For the best trellis path, the code translates the trellis algorithms in (5) written as a state metric update equation, into a Matlab code format for calculation of the state $S_k$ metric $\alpha_k(S_k)$ for the best trellis transition path. ML trellis algorithm finds the last symbol "i" with the best path "jx" to the new symbol "j" whereas the MAP algorithm finds the new symbol "j" with the best path "xi" from the last symbol "i" to support a reduction in the number of paths "xi" when necessary to reduce the computational complexity. For the state update for k≥D the state metric $S_k$ is upgraded for this new path jxi by the update operations $S_k(:,jx) = [\hat{z}_k(jxi); S_{k-1}(1:D-1, xi)]$, $S_k(:,xi) = [\hat{z}_k(jxi); S_{k-1}(1:D-1, jx)]$ respectively for ML, MAP using Matlab notation which replaces the column jx, xi vector with the column xi, jx vector after the elements of xi, jz have been moved down by one symbol and the new symbol $\hat{z}_k$ added to the top of the column vector which is the row 1 element.

Figure 9A:
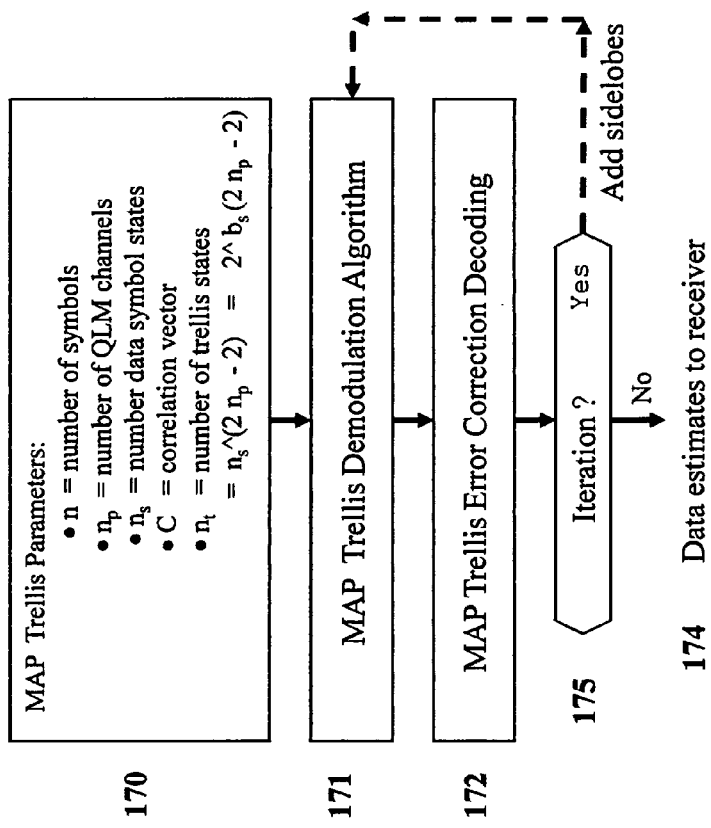
FIG. 9A is a flow diagram of a MAP trellis symbol demodulation algorithm.

FIG. 9A is a summary implementation flow diagram of a representative MAP trellis data symbol demodulation algorithm with error correction decoding and with the option of including the sidelobes in subsequent iterations. Basic elements of the algorithm are the trellis parameters 170, MAP trellis algorithm 171 structured by the parameter set in 170, and followed by trellis error correction decoding 172 which also could be combined with the trellis demodulation, and with the option 175 to include the sidelobes in an iteration(s)

or to end the iteration(s) and handover 174 the data estimates to the receiver. The parameter set 170 is applicable to the mainlobes of the data symbol waveforms with two examples illustrated in FIG. 5,6. The correlation function for the data symbol waveforms defined in FIG. 5,6 have low sidelobes compared to the mainlobes which suggests it is sufficient to consider mainlobe correlation in the MAP trellis algorithm with the sidelobes included in subsequent iterations. A one-sided correlation vector C is used since the correlation is symmetrical about the origin, whose elements are the mainlobe correlation coefficients $C=[c(0), c(1), \ldots, c(n_p-1)]$ wherein $c(0)=1$ with waveform normalization. Waveform modulations emphasized are 4PSK, 8PSK, 16QAM, 64QAM, 256QAM with $b_s=2, 3, 4, 6, 8$ uncoded bits per data symbol and $n_s=2^{b_s}=4, 8, 16, 64, 256$ states per data symbol.

Figure 9B:
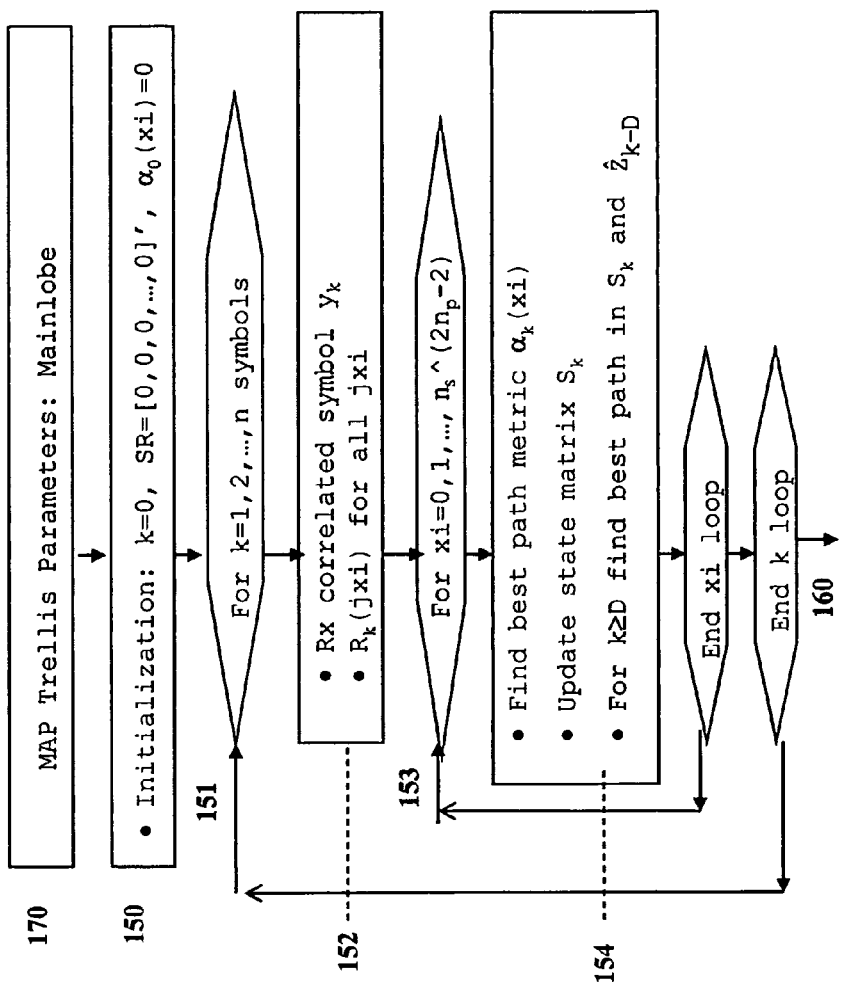
FIG. 9B is the continuation the flow diagram of the MAP trellis symbol demodulation algorithm.
Figure 9C:
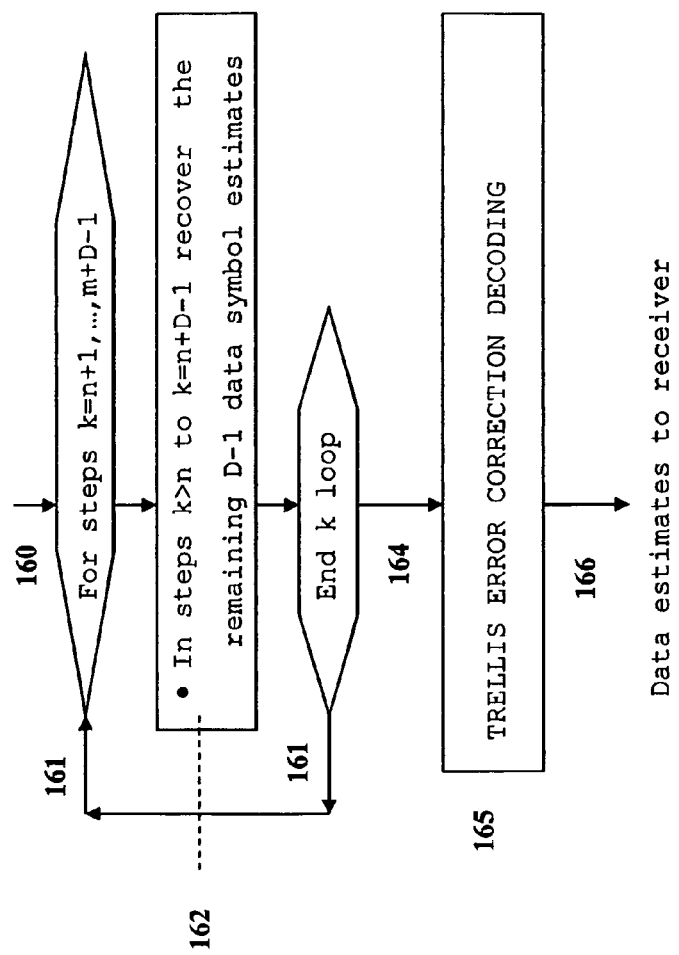
FIG. 9C is the continuation of the flow diagram of the MAP trellis symbol demodulation algorithm.

FIG. 9B,9C is a detailed implementation flow diagram of the MAP trellis data symbol demodulation algorithm in FIG. 9A for mainlobe demodulation. FIG. 9B uses the trellis parameters 170 in the initialization 150 prior to the start k=0 with an empty shift register SR which normally contains the $2n_p-1$ correlated data symbols for the mainlobe for each node being addressed. At k=0 the path metric $\alpha_0(xi)$ is set equal to a negative or zero initialization constant for all of the nodes $xi=0, 1, 2, \ldots, (n_s^{(2n_p-2)}-1)$ of the trellis diagram where $\alpha_0(xi)$ is the logarithm of the state $S_0$ path metric at k=0 for node xi, the receive Rx symbols are indexed over k with k=0 indicating the initial value prior to the Rx symbol k=1, nodes of the trellis diagram are the states of the shift register SR, and state $S_k$ refers to the trellis diagram paths and metrics at symbol k in the trellis algorithm.

In FIG. 9B loop 151 processes the Rx symbols k=1, 2, . . . , n where the index k also refers to the corresponding algorithm steps and the states of the trellis algorithm. In 152 the Rx signals are pulse detected to remove the carrier frequency and waveform to recover the normalized correlated data symbol $y_k$. For each Rx symbol $y_k$ the state transition decisioning metrics $R_k(jxi)$ are calculated by the transition metric equations $\{R_k(jxi)=-|y_k-\hat{x}_k(jxi)|^2\}$ for a ML metric, $\{R_k(jxi)=|\hat{x}_k|^2-2\text{Real}(y_k\hat{x}_k(jxi))^*\}$ for a MAP metric wherein (o)* is the complex conjugate of (o), for $\{R_k(jxi)=\text{Metric}(y_k, \hat{x}_k)\}$ for another metric, for all possible transition paths $\{jxi\}$ from the previous state $S_{k-1}(xi)$ at node xi to the new state $S_k(jx)$ at node jx in the trellis diagram and where $\hat{x}_k(jxi)$ is the hypothesized normalized detected correlated symbol k for the path jxi. For a mainlobe correlation function the $\hat{x}_k(jxi)$ is defined by the equation $\hat{x}_k(jxi)=c(n_p-1)[sr(1)+sr(2n_p-1)]+ \ldots +c(1)[sr(n_p-1)+sr(n_p+1)]+c(0)[sr(n_p)]$ which calculates $\hat{x}_k(jxi)$ as the correlated weighted sum of the elements of the shift register $SR=[sr(1), sr(2), \ldots, sr(2n_p-1)]'$ with $\hat{z}_k=sr(n_p), \hat{z}_{k-1}=sr(n_p-1), \hat{z}_{k+1}=sr(n_p+1), \ldots$ where $c(0)=1$, the normalized data symbol estimates $\{\hat{z}_k\}$ correspond to the transition index jxi, and the state k estimated symbol $\hat{z}_k$ is the SR center element $sr(n_p)$ with correlation coefficient $c(0)=1$. Symbols move from left to right starting with "j" with each new received symbol or step in the trellis recursion algorithm, and ending with "i". With this convention "j" is indexed over the states of sr(1), "x" is indexed over the current states of $sr(2), \ldots, sr(2n_p-2)$, and "i" is indexed over the states of $sr(2n_p-1)$. Index over the paths of the trellis diagram is defined by the equation $jxi=sr(1)+n_s sr(2)+n_s^2 sr(3)+ \ldots +n_s^{(2n_p-2)} sr(2n_p-1)-1=0, 1, 2, \ldots, n_s^{(2n_p-1)}-1$ when the contents of the SR elements are the indices corresponding to the assumed data symbol state values.

In FIG. 9B loop 153 calculates the best trellis transition paths from state $S_{k-1}$ to the new state $S_k$ for $xi=0, 1, 2, \ldots, n_s^{(2n_p-2)}-1$. In 154 the path metric $\alpha_k(S_k)$ is defined by the recursive logarithm equation $\alpha_k(S_k)=\alpha_{k-1}(S_{k-1})+R_k(S_{k-1}\rightarrow S_k)$ which can be rewritten as $\alpha_k(xi)=\alpha_{k-1}(jx)+R_k(jxi)$ since $\alpha_k(S_k)=p(S_k|y_k)=\alpha_k(xi)$, $\alpha_{k-1}(S_{k-1})=p(S_{k-1}|\alpha_{k-1}(jx), R_k(S_{k-1}\rightarrow S_k)=R_k(jxi)$ from equation (5). The best path metric $\alpha_k(xi)$ for each new node jx is chosen by the decisioning equation $\alpha_k(xi)=\min\{\alpha_{k-1}(jx)+R_k(jxi)\}$ with respect to the admissible "j". For each jx, the corresponding xi yielding the highest value of the path metric $\alpha_k(xi)$ is used to define the new symbol $\hat{z}_k$ and path.

In FIG. 9B for k the state metric $S_k$ is upgraded for this new path jxi by the operation $S_k(:,xi)=[\hat{z}_k(jxi); S_{k-1}(:,jx)]$ which replaces the column xi vector with the column jx vector after the new symbol $\hat{z}_k$ has been added to the top of the column which is the row 1 element to increase the path size by one. State $S_k$ is a k by $(n_\phi^{(2n_p-2)})$ matrix with the column vectors equal to the trellis states over the past k symbols.

In FIG. 9B for K≥D the state metric $S_k$ is upgraded for this new path jxi by the update operation $S_k(:,xi)=[\hat{z}_k(jxi); S_{k-1}(1:D-1,jx)]$ using Matlab notation which replaces the column xi vector with the column jx vector after the elements of jz have been moved down by one symbol and the new symbol $\hat{z}_k$ added to the top of the column vector which is the row 1 element. State $S_k$ is a D by $(n_s^{(2n_p-2)})$ matrix with the column vectors equal to the trellis states over the past D symbols where "D" is the trellis decoding memory extending over several correlation lengths $(2n_p-1)$ for the solution to be stabilized. In Matlab notation the $S_k(:,xi)$ is the column vector xi of $S_k$ consisting of the new symbol $\hat{z}_k$ and the previous D-1 symbols along the trellis path to node xi and the $S_{k-1}(1:D,jx)$ is the D×1 column vector of $S_{k-1}$ for the previous node jx.

In FIG. 9B metric values for each path in $S_k$ are stored for later use in soft decisioning turbo and convolutional decoding. Metrics of interest for each symbol k and for each xi are the values of $\{\alpha_{k-1}(jx)+R_k(jxi)\}$ for all admissible jx states for the new path symbol $\hat{z}_k$ for xi for k.

In FIG. 9B for symbols the estimated values $\hat{Z}_{k-D}$ of the Tx symbols are delayed by the path length D and read from the last row element of the column jx path vector of the state metric $S_k$ for symbol k, and the readout continues until k=n. This ends the jx loop 153 and the k loop 151.

In FIG. 9C processing 162 continues with steps k=n+1, . . . , n+D-1 160, 161 to recover the estimated values $\hat{Z}_{k-D}$ of the Tx symbols $Z_k$ which are read from the corresponding row elements D-1, D-2, . . . , 1 of the column jx path vector of the state metric $S_n$ for the last symbol k=n. This ends the jx loop 161.

In FIG. 9C outputs 164 of the trellis algorithm used for trellis decoding are the estimates $\{\hat{Z}_k\}$ of the transmitted symbols $\{Z_k\}$ and the corresponding metric values for all admissible states for each new path symbol $\hat{Z}_k$ for all k. These symbol estimates and metric measurements are the soft decisioning data estimates handed over 165 to recover the Tx data or handed over for error correction decoding 166 with turbo or convolutional decoding. Another option is to combine the error correction decoding with the symbol recovery.

Figure 10:
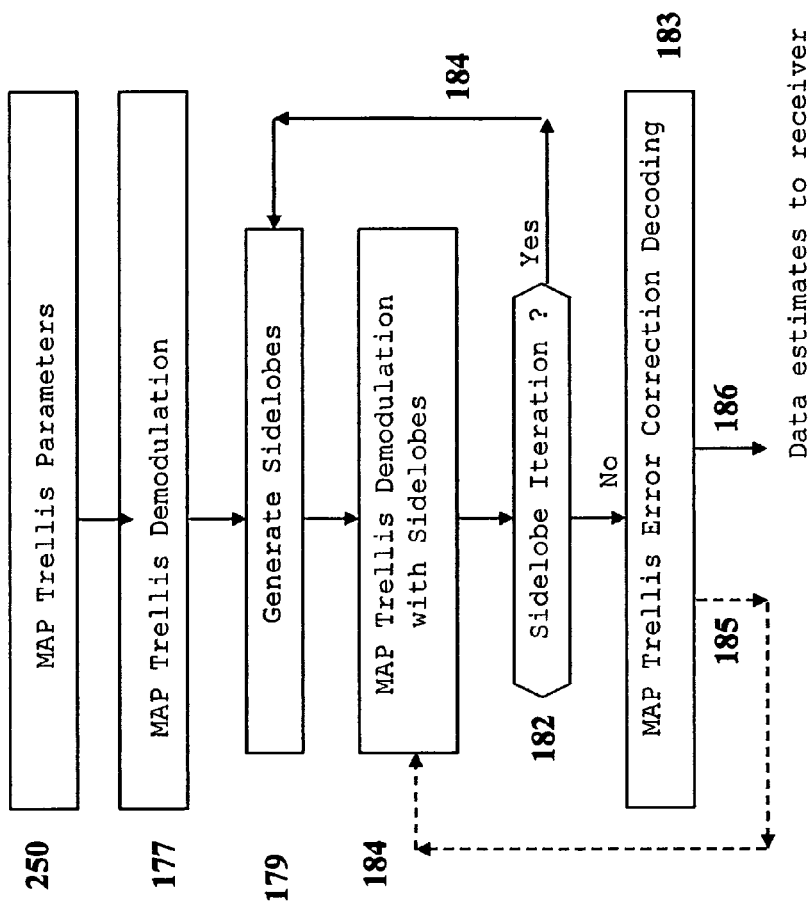
FIG. 10 is a flow diagram of the MAP trellis symbol demodulation algorithm with sidelobes included.

FIG. 10 is a flow diagram of an iterative version of the MAP data symbol trellis algorithm in FIG. 9 wherein the iteration is used to incorporate the effects of the sidelobes of the correlation function C into the trellis state transition metric $R_k(jxi)$ in 152 in FIG. 9B with a relatively small increase in computational complexity. In FIG. 10 the algorithm is initialized with the parameter set in 176 which is the parameter set in 170 in FIG. 9A with the partitioning of the correlation vector C into the mainlobe vector $C_0$ plus the sidelobe vector $C_1$ and adding the specification of the stopping rule for the iterations. For a correlation vector $C=[c(0), c(1), \ldots, c(n_p-1), c(n_p), \ldots, c(n_c)]$ consisting of $n_c$ correlation coefficients, the mainlobe vector is $C_0=[c(0), c(1), \ldots, c(n_p-1), 0, 0, \ldots, 0]$ and the sidelobe vector is $C_1=[0, 0, \ldots, 0, c(n_p), \ldots, c(n_c)]$ to partition $C=C_0+C_1$. The algorithm starts 177 by implementing the MAP algorithm in FIG. 9.

In FIG. 10 the output data symbol estimates 164 in FIG. 9C are the outputs from the MAP algorithm in 177 and are used to calculate the a-priori estimated sidelobe contribution $\hat{x}_{k|1}$ in 179 to $\hat{x}_k(jxi)$ which is the hypothesized normalized detected correlated symbol k for the path jxi in the calculation of the metric $R_k(jxi)$ in 152 in FIG. 9B. In this implementation 180 of the trellis algorithm 171 in FIG. 9A, the $\hat{x}_k(jxi)=\hat{x}_{k|0}(jxi)+\hat{x}_{k|1}$ is the sum of the hypothesized mainlobe contribution $\hat{x}_{k|0}(jxi)$ using the non-zero $C_0$ coefficients as described in FIG. 9A and the sidelobe contribution $\hat{x}_{k|1}$ using the data symbol estimates from 177 and the non-zero $C_1$ coefficients and wherein the subscripts "k|0" reads "index k given $C_0$" and "k|1" reads "index k given $C_1$". From 152 in FIG. 9B we find the $\hat{x}_{k|0}(jxi)$ is defined by the equation $\hat{x}_{k|0}(jxi)=c(n_p-1)[sr(1)+sr(2n_p-1)]+\ldots+c(1)[sr(n_p-1)+sr(n_p+1)]+c(0)[sr(n_p)]$ which calculates $\hat{x}_{k|10}(jxi)=\hat{x}_k(jxi)$ in FIG. 9B as the correlated weighted sum of the elements of the shift register $SR=[sr(1), sr(2), \ldots, sr(2n_p-1)]'$ with $\hat{z}_k=sr(n_p)$, $\hat{z}_{k-1}=sr(n_p-1)$, $\hat{z}_{k+1}=sr(n_p+1), \ldots$ where $c(0)=1$, the normalized data symbol estimates $\{\hat{z}_k\}$ correspond to the transition index jxi, and the state k estimated symbol $\hat{z}_k$ is the SR center element $sr(n_p)$ with correlation coefficient $c(0)=1$. Symbols move from left to right starting with "j" with each new received symbol or step in the trellis recursion algorithm, and ending with "i". With this convention "j" is indexed over the states of sr(1), "x" is indexed over the current states of $sr(2), \ldots, sr(2n_p-2)$, and "i" is indexed over the states of $sr(2n_p-1)$. Index over the paths of the trellis diagram is defined by the equation $jxi=sr(1)+n_s\, sr(2)+n_s^2\, sr(3)+\ldots+n_s^{(2n_p-2)}\, sr(2n_p-1)-1=0, 1, 2, \ldots, n_s^{(2n_p-1)}-1$ when the contents of the SR elements are the indices corresponding to the assumed data symbol state values. The sidelobe contribution is equal to $\hat{x}_{k|1}=c(n_p)(\hat{Z}_{k-n_p}+\hat{Z}_{k+n_p})+c(n_p+1)(\hat{Z}_{k-1-n_p}+\hat{Z}_{k+1+n_p})+c(n_p+2)(\hat{Z}_{k-2-n_p}+\hat{Z}_{k+2+n_p})+\ldots$ until the end of the sidelobe correlation coefficients or the end of the data symbol bit estimates and wherein $\hat{Z}_{k-n_p}$ is the data symbol estimate in 180 for symbol $k-n_p$. A stopping rule in 182, 184 is used to decide if another iteration is required. When another iteration is required the data symbol bit estimates are used to update the calculation of the a-priori contribution $\hat{x}_{k|1}$ of the sidelobes to the $\hat{x}_k(jxi)$ in the modified trellis algorithm 184. After the iteration is stopped the outputs are error corrected decoded 183 and handed over to the receiver. A possible alternative path is to use the decoded output estimates 185 to re-start 184 the MAP trellis demodulation algorithm with sidelobes.

Word-sliced MAP trellis algorithms offer a means to reduce the computational complexity of the trellis algorithm by processing slices of the data symbol encoded word in sequence. Limitations on the fidelity of the word-sliced decisioning are the symbol-to-symbol interference on the decisioning manifolds due to the overlap of the QLM data symbol waveforms. A half-word slice tends to minimize this interference and still offer a considerable reduction in computational complexity. With a half-word (½-word) slice the digital word $b_s=b_0b_1b_2\ldots b_{s-1}$ for each $b_s$ bit data symbol is sliced into the $b_s/2$ bit words $b_{w1}=b_0b_1b_2\ldots b_{s/2-1}$ and $b_{w2}=b_{s/2}b_{s/2+1}\ldots b_{s/2-1}$ which reduces the number of trellis states from $2^{\hat{}}b_s(2n_p-2)$ to $2^{\hat{}}(b_s/2)(2n_p-2)$ for each word-slice. This means that to double the data rate for a communications link using a $b_s=8$ bit 256QAM data symbol modulation, QLM requires $n_p=2$ and the trellis demodulation algorithm requires $2^{\hat{}}b_s(2n_p-2)=2^{\hat{}}16=66K$ states whereas a half-word-sliced demodulation algorithm requires $2^{\hat{}}(b_s/2)(2n_p-2)=2^{\hat{}}8=256=0.3K$ states for each of two passes.

Figure 11:
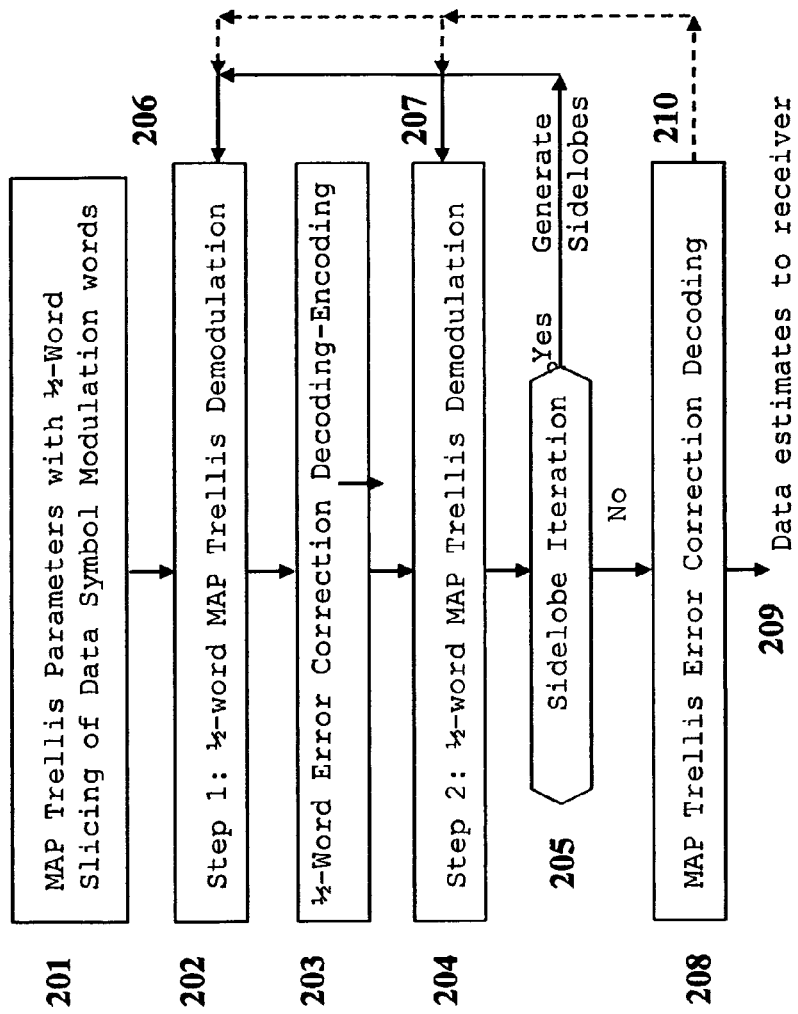
FIG. 11 is a flow diagram of the MAP trellis ½-word sliced demodulation algorithm.

FIG. 11 is a flow diagram of a MAP trellis ½-word sliced demodulation algorithm with iteration to include the effects of the sidelobes of the correlation function C in the trellis state transition metric $R_k(jxi)$ in 152 in FIG. 9B. The algorithm is initialized with the parameter set in 201 which is the parameter set 170 in FIG. 9A with the identification of the two word $b_{w1}=b_0b_1b_2\ldots b_{s/2-1}$ and $b_{w2}=b_{s/2}b_{s/2+1}\ldots b_{s/2-1}$ partitioning of each data symbol modulation word $b=b_0b_1b_2\ldots b_{s-1}=b_{w1}b_{w2}$. Step 1 in 202 executes the MAP trellis algorithm in FIG. 9 using the ½-word $b_{w1}$ for the data symbol modulation word input to the modulator to generate the complex data symbol estimates used to calculate the correlated data symbol estimate $\hat{x}_k(jxi)$ input to the state transition decisioning metric $R_k(jxi)$ in 152 in FIG. 9B. The mapping of the data symbol words onto the complex plane which includes assigning the digital words to each of the points defines the data symbol modulator function used to calculate $\hat{x}_k(jxi)$ for each jxi. It is important that this mapping minimize the symbol-to-symbol interference of the correlated symbols decisioning manifolds which for the ½-word example being addressed are the boundaries of the data sets $b_{w1}$ and $b_{w2}$. Error correction encoding 203 will correct modest levels of interference errors which generate bit-error-rate BER noise floors for the QLM demodulation. Interference levels of ~0.01=BER are acceptable for correction by coding.

In FIG. 11 the step 2 in 204 implements the MAP trellis demodulation algorithm in FIG. 9 by using the words $b_{x1}$ generated by the data estimates from Step 1 in 202 plus the new postulated words $b_{w2}$ to complete the data symbol modulation word inputs to the modulator to generate the complex data symbol estimates used to calculate the correlated data symbol estimated inputs $\hat{x}_k(jxi)$ to the state transition decisioning metric $R_k(jxi)$ in 152 in FIG. 9B. This enables the MAP trellis algorithm in FIG. 9 to be implemented using this full word $b_s$ construction $b_s=b_{w1}\, b_{w2}$ for the data symbol modulation words used to generate these data symbol estimates $\hat{x}_k(jxi)$ in 152 in FIG. 9B.

In FIG. 11 the sidelobe iteration 205 calculates the sidelobes using the trellis data symbols from Step 2 in 203 and transfers these estimates to the ½-word Step 1 trellis algorithm 206 and the ½-word Step 2 trellis algorithm 207 which algorithms now include the required sidelobe modifications 184 implemented in the full symbol MAP trellis demodulation algorithm with sidelobes. A stopping rule 205 is used to decide if another iteration is required. When another iteration is required the data symbol bit estimates are used to update the calculation of the a-priori contribution $\hat{x}_{k|1}$ of the sidelobes to the $\hat{x}_k(jxi)$ in the modified trellis algorithm in Steps 1, 2 taking into account the word partition changes. After the iteration is stopped the outputs are error corrected decoded 208 and handed over to the receiver 209 A possible alternative path is to use the decoded output estimates 210 to re-start the MAP ½-word trellis demodulation algorithm with sidelobes.

FIG. 12 compares the number of required trellis states or nodes for the MAP data symbol trellis algorithm, the ½-word trellis algorithm in FIG. 11, and the MAP reduced path trellis algorithm in FIG. 13 for QLM data rates $n_p=2, 3, 4$ times the existing data rates and which can be interpreted as using QLM to overlay existing communications channels with $n_p-1=1, 2, 3$ additional channels to increase the number of simultaneous channels to $n_p=2, 3, 4$. The number 250 of correlated data symbols over the mainlobes in FIG. 5,6 is equal to $(2n_p-1)$ and these data symbols are used in the trellis diagrams with the sidelobes included in subsequent iterations as described in FIG. 10,11,13D. Trellis algorithms use one less than the number of correlated data symbols for the active nodes which means the number of trellis nodes is equal to $(2n_p-2)$. The definitions 251 for the number of nodes or states for the trellis algorithms are used 252 to calculate the number of nodes or states in 253, 254, 255 for the full symbol or word, ½-word, and the reduced path or node MAP trellis algorithms to demodulate $b_s$=8 bit 256QAM data symbol modulation used for the highest data rate modes in WIFi, WiMax, LTE cellular communications and widely used for other communication applications.

In FIG. 12 it is observed that the MAP full data symbol trellis algorithm 253 is limited to $n_p$=2 QLM layers of communications with acceptable number of nodes or states. The MAP ½-word data symbol trellis algorithm 254 can be used to support $n_p$=2, 3 QLM layers with acceptable number of nodes or states. However, the MAP reduced path data symbol trellis algorithm 255 has the capability of supporting $n_p$=2, 3, 4 and higher QLM layers of communications with acceptable number of nodes or states for demodulating each $b_s$=8 bit 256QAM data symbol with rate ¾ coding to yield b=6 information bits per data symbol. To place this complexity in perspective, turbo decoding algorithms require computational complexities on the order of $2^8$ to $2^{10}$ equivalent states or nodes per decoded bit, The complexity range 255 for the reduced trellis algorithm assumes the lower values correspond to assuming the number $b_p$ of paths is 2 bits for 4 paths with a word slice is $b_w$=1 bit and the upper values assume $b_p$=4 bits for 16 paths with a word slice $b_w$=2 bits.

In FIG. 13 the reduced path algorithm is structured as a series of passes for each correlated data sample, to generate the group of trellis nodes which include the correct trellis node. The data symbol word $b_s$ is partitioned into $n_w$ bit slices which means $b=b_{w1}b_{w2}\ldots b_{wp}$ with each slice consisting of $b_s/n_w$ bits. This partitioning is a continuation of the ½-word slice used for the ½-word sliced trellis algorithm in FIG. 11. However, the use of these slices is entirely different from the algorithm in FIG. 11. The reduced path algorithm uses the slices to simplify the calculation of the trellis estimates at each node for each data sample and the trellis paths over these nodes are used to find the best trellis path to complete the trellis demodulation for the data symbol words whereas the ½-word algorithm computes the trellis nodes using the words for each slice and finds the best trellis path to complete the trellis demodulation for each of the data symbol slices.

FIG. 13 is a flow diagram of the reduced path algorithm which differs from the MAP trellis algorithm starting with loop 153 in FIG. 9B. The MAP algorithm is implemented as a series of passes starting with Pass 1 in 152. Each pass 1, 2, ... processes a consecutive word slice consisting of $b_{w1}$, $b_{w2}$, ... bits for each of the selected $2^{b_p}$ trellis paths wherein $b_y$ is the size in bits of the group P of trellis paths p=1, 2, ..., $2^{b_p}$ and continues until the complete modulation word $b_s=b_1 b_2 \ldots b_s=b_{w1}b_{w2}\ldots$ is processed. Pass 1 in 1) finds the best path metric $\alpha_k(xi)$ for each xi=1, 2, ..., $2^{b_w}(2n_p-2)$ over all possible values for the product of $b_w$ with the number $2n_p-2$ of mainlobe correlations minus one, by solving the decisioning equation in 154 in FIG. 9B which is $\alpha_k(xi)$ =$\min\{\alpha_{k-1}(jx)+R_k(jxi)\}$, where the "min" is with respect to the admissible "j". For each jx, the corresponding xi yields the best value of the path metric $\alpha_k(xi)$. Pass 1 2) selects the group P of the $2^{b_p}$ paths with the minimum path metrics $\{\alpha_k(xi)|P\}$ from the somewhat larger set $\{\alpha_k(xi)\}$ calculated in pass 1 1). Pass 1 3) stores the node values, paths, and path metrics which are required for Pass 2. Pass 1 4) updates path metric matrix $S_k$ for the $2^{b_p}$ paths wherein $S_k$ is a temporary state which is used only over the passes and after which the data is handed over to the path metric $S_k$ for processing over the k=1, 2, ..., n data symbols similar to FIG. 9 with the exception that the trellis paths are restricted to the group P.

FIG. 13B implements step 2 using the data 154 from step 1. Pass 2 1) finds the best path metrics for each of the trellis paths xi={xi|P} in P wherein xi designates the selected trellis paths from pass 1. There are xi=1, 2, ..., $b_{w2}^{\wedge}(2n_p-2)$ possible trellis paths for each xi and the decisioning equation in 154 in FIG. 9B is $\alpha_k(xi)=\min\{\alpha_{k-1}(jx)+R_k(jxi)\}$ where the "min" is with respect to the admissible "j". The decisioning metric $R_k(jxi)$ is evaluated using the xi, j and the pass 1 node values, paths, and path metrics to specify the contributions of pass 1 bit slice $b_{w1}$ to the evaluation of $R_k(jxi)$ for the combined word slice $b_{w1} b_{w2}$. This process finds the best path metric $\alpha_k(xi)$ for each xi. Next, the best path metric $\alpha_k(xi)=\min\{\alpha_k(xi|xi\}$ is found from the set $\{\alpha_k(xi)|xi\}$ for each xi and the processing continues over all of the xi. Step 2 2) stores node values, paths, and path metrics for pass 2. Step 2 3) updates path metric matrix $S_k$ for each of the $2^{b_p}$ paths.

FIG. 13C accepts the data 156 from pass 2 to continue the steps until completion of the final step whereupon in 157 the post-processing 1) for each xi={xi|P} finds the best path metric $\alpha_k(xi)$, 2) transfers the last row of $S_k$ to $S_k$ and continues the processing of loop 153 in FIG. 9B to calculate the best trellis transition paths from state $S_{k-1}$ to the new state $S_k$ for xi={xi|P}, 3) for k≥D find best path in $S_k$ and the demodulated data symbol $\hat{Z}_{k-D}$. and 4) end the xi loop.

In FIG. 13C for k≤D the state metric $S_k$ is upgraded for this new path jxi by the operation $S_k(:,xi)=[\hat{z}_k(jxi); S_{k-1}(:,jx)]$ which replaces the column xi vector with the column jx vector after the new symbol $\hat{z}_k$ has been added to the top of the column which is the row 1 element to increase the path size by one. State $S_k$ is a k by $2^{b_p}$ matrix with the column vectors equal to the trellis states over the past k symbols.

In FIG. 13C for K≥D the state metric $S_k$ is upgraded for this new path jxi by the update operation $S_k(:,xi)=[\hat{z}_k (jxi); S_{k-1}(1:D-1,jx)]$ using Matlab notation which replaces the column xi vector with the column jx vector after the elements of jx have been moved down by one symbol and the new symbol $\hat{z}_k$ added to the top of the column vector which is the row 1 element. State $S_k$ is a D by $2^{b_p}$ matrix with the column vectors equal to the trellis states over the past D symbols where "D" is the trellis decoding memory extending over several correlation lengths $(2n_p-1)$ for the solution to be stabilized. In Matlab notation the $S_k(:,xi)$ is the column vector xi of $S_k$ consisting of the new symbol $\hat{z}_k$ and the previous D−1 symbols along the trellis path to node xi and the $S_{k-1}(1:D,jx)$ is the D×1 column vector of $S_{k-1}$ for the previous node jx.

In FIG. 13C metric values for each path in $S_k$ are stored for later use in soft decisioning turbo and convolutional decoding. Metrics of interest for each symbol k and for each xi are the values of $\{\alpha_{k-1}(jx)+R_k(jxi)\}$ for all admissible jx states for the new path symbol $\hat{z}_k$ for xi for k.

In FIG. 13C for symbols k≥D the estimated values $\hat{Z}_{k-D}$ of the Tx symbols are delayed by the path length D and read from the last row element of the column jx path vector of the state metric $S_k$ for symbol k, and the readout continues until k=n. This ends the jx loop 153 and the k loop 151.

In FIG. 13C processing 151 which is processing 162 in FIG. 9C continues with 1) steps k=n+1, ..., n+D−1, 2) in steps k>n to k=n+D−1 recover the remaining D−1 data symbol estimates $\hat{Z}_{k-D}$ of the Tx symbols $Z_k$ which are read from the corresponding row elements D−1, D−2, ..., 1 of the column jx path vector of the state metric $S_n$ for the last symbol k=n, and 3) this ends the k loop which is loop 161 in FIG. 9C. In 4) trellis error correction decoding is performed which is described in 9C as follows: outputs 164 of the trellis algorithm used for trellis decoding are the estimates $\{\hat{Z}_k\}$ of the transmitted symbols $\{Z_k\}$ and the corresponding metric values for all admissible states for each new path symbol $\hat{Z}_k$ for all k. These symbol estimates and metric measurements are the soft decisioning data estimates handed over 165 to recover the Tx data or handed over for error correction decoding 166 with turbo or convolutional decoding. Another option is to combine the error correction decoding with the symbol recovery.

FIG. 13D is a flow diagram of the MAP reduced path demodulation algorithm with iteration to include the effects of the sidelobes of the correlation function C in the trellis state transition metric $R_k(jxi)$ in 155 in FIG. 13B. iterative version of the MAP reduced path trellis demodulation algorithm is similar to FIG. 10 iterative version of the MAP trellis demodulation algorithm wherein the iteration is used to incorporate the effects of the sidelobes of the correlation function C into the trellis state transition metric $R_k(jxi)$ in 152 in FIG. 9B with a relatively small increase in computational complexity. In FIG. 13D the algorithm is initialized with the parameter set in 176 which is the parameter set in 170 in FIG. 9A with the partitioning of the correlation vector C into the mainlobe vector $C_0$ plus the sidelobe vector $C_1$ and adding the specification of the stopping rule for the iterations. For a correlation vector $C=[c(0), c(1), \ldots, c(n_p-1), c(n_p), \ldots, c(n_c)]$ consisting of $n_c$ correlation coefficients, the mainlobe vector is $C_0=[c(0), c(1), \ldots, c(n_p-1), 0, 0, \ldots, 0]$ and the sidelobe vector is $C_1=[0, 0, \ldots, 0, c(n_p), \ldots, c(n_c)]$ to partition $C=C_0+C_1$. The reduced path algorithm only differs in the calculation of the MAP trellis demodulation in 171 in FIG. 9A.

FIG. 14 presents a representative set of ML QLM architectures for time differentiating parameters which support implementable ML demodulation algorithms with acceptable demodulation losses and with applicability to a broad spectrum of communications systems. The three architectures are a $n_s=2$-symbol group 101, a $n_s=3$-symbol group 102, and a $n_s=4$-symbol group 103, with each group respectively consisting of $n_s=2, 3, 4$ contiguous symbols 104, 106, 108 for the first QLM layer $n_p=1$. For this architecture the ns is the number of symbols in the symbol group corresponding to the absence of QLM for $n_p=1$. QLM layers for $n_p>1$ are overlayed on each group of symbols such that the additional QLM symbols stay within the composite bandwidth for each symbol group. These architectures assume the sidelobes of the data symbols will be included in the trellis algorithms by an iterative algorithm similar to the sidelobe algorithm disclosed in FIG. 10.

FIG. 15 measures the trellis decoding performance for uncoded 4PSK pulse waveforms for no QLM wherein $n_p=1$ and for $n_p=2, 3, 4$ layers of QLM modulation using the trellis data symbol decoding algorithm in FIG. 9 and for $n_p=4, 6$ layers by implementing the ½-word trellis data symbol decoding algorithm in FIG. 11. Performance validates QLM technology and scaling. QLM performance is plotted as bit error rate BER versus the QLM normalized value $(E_b/N_o)/n_p$ of the $E_b/N_o$. Measured performance values are from a direct error count Monte Carlo simulation of the trellis algorithm and are plotted as discrete measurement points. It is expected that higher order modulations 8PSK, 16QAM, 64QAM, 256QAM will have the same relative trellis coding performance for $n_p=1, 2, 3, 4, 5, 6$ layers of communications.

FIG. 16 measures the ML decoding performance for uncoded 256QAM pulse waveforms for no QLM wherein $n_p=1$ and for $n_p=8$ layers of QLM modulation using $n_s=3, 4$ data symbol groups and implementing the ML symbol demodulation algorithm in (8). The 256QAM bound assumes ideal Grey code assignment of the data bits to the 256 data points in the complex plane and therefore provides improved performance compared to the 256 point regular data mapping used in the simulations. Similar performance has been measured for lower order modulations using ML decoding.

FIG. 17,18 calculate the QLM information rate b Bps/Hz (information bits per data symbol interval $T_s$) performance vs. $E_b/N_o$, S/N=C/I respectively using the MAP trellis demodulation algorithm and ML symbol demodulation algorithm BER performance, examples of which are disclosed in FIG. 15,16 wherein C/I=carrier/interference power ratio. Performance calculated are the Shannon bound, new bound (von der Embse bound), ideal 4PSK, 8PSK, 16QAM, 64QAM, 256QAM, 4096QAM, MAP trellis demodulation, and ML demodulation for $n_p=3$, 4 layers of communications. Equation (2) is used to calculate the Shannon bound, equation (5) is used to calculate the new bound, modulation performance for 4PSK, 8PSK, 16QAM, 64QAM, 256QAM, 1024QAM assumes turbo coding performance provides a performance almost equal to the Shannon bound and with information rate b=1.5, 2, 3, 4, 6, 8 bits=Bps/Hz respectively assuming coding rates R=¾, ⅔, ¾, ⅔, ¾, ⅔ and bits per symbol $b_s$=1.5, 2, 3, 4, 6, 8 bits respectively for 4PSK, 8PSK, 16QAM, 64QAM, 256QAM, 4096QAM.

FIG. 19 parameters 121 are used to calculate the MAP trellis and ML demodulation performance. MAP parameter values 122 are selected to provide best values for b while avoiding excessive numbers of layers $n_p$ which increase the sidelobe induced demodulation loss and increase the required synchronization accuracy to support the $n_p$. Plot point 5 lists two alternative candidates to achieve b=24 Bps/Hz which are: 64QAM requires $n_p=6$ layers and $E_b/N_o=17.3$ dB, and 256QAM requires a lower $n_p=4$ layers and a slightly higher $E_b/N_o=18.2$ dB. The 256QAM appears to be the preferred candidate since the $n_p$ is somewhat lower. ML parameter values 1, 2, 3 for the $n_s=3$ data symbol group assume $n_p=4$ QLM layers and the resulting performance in FIG. 17,18 is considerable lower than the MAP performance in FIG. 17,18. ML performance approaches the MAP performance in FIG. 17,18 for a $n_s=4$ data symbol group with increased number of QLM layers to $n_p=6$.

Figure 1:
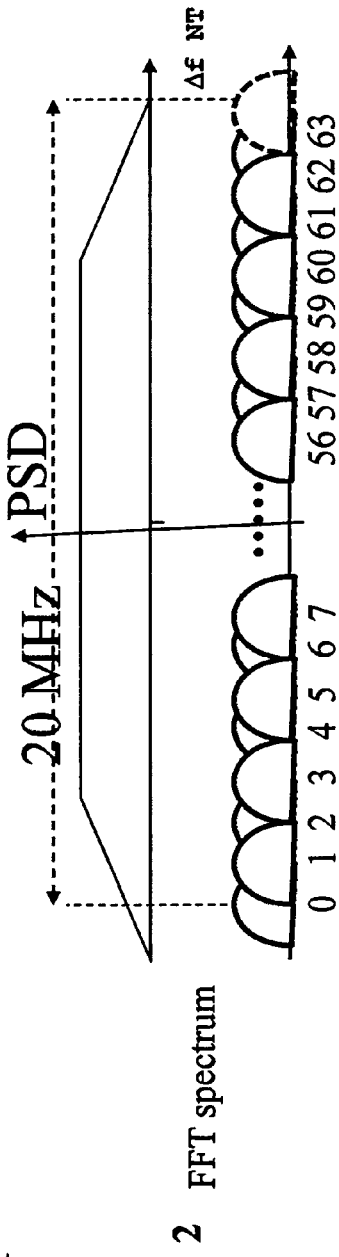

FIG. 20 is an ideal OFDM transmitter block diagram modified to support OFDM QLM with frequency offsets as the differentiating parameter to increase the symbol transmission rate from $1/T_s$ to the QLM rate $n_p/T_s$ and with an increase in transmitter power to support this increased data rate. FIG. 20 differs from FIG. 1 in the deletion of the 4.0 µs delay between the FFT output NT and the transmitted FFT output $NT_s=NT+4.0$ µs, and in the use of the complete FFT band for transmission, in order to apply to all of the IEEE standard OFDM systems. Ideal OFDM modulates N input data symbols at the sample rate $1/T_s$ over the time interval $NT_s$ with an N-point inverse fast fourier transform $FFT^{-1}$ to generated N harmonic waveforms $e^{\hat{}}j2\pi kn/N$ with each modulated by the corresponding data symbol wherein the normalized frequencies k=0, 1, ... N−1 correspond to channels 0, 1, ..., N−1, "j"=√(−1), "π"=pi", and "n" is a time index. Data symbol output rates are 1/NT, per channel and the N channels have a total symbol rate equal to $N/NT_s=1/T_s=B$=(Nyquist sample rate). Signal processing starts with the stream of user input data words $\{d_k\}$ 46 with k indexed over the words. Frame processor 47 accepts these data words and performs turbo error correction encoding, error detection cyclic redundant encoding CRC, frame formatting, and passes the outputs to the symbol encoder 48 which encodes the frame data words into data symbols for handover to the OFDMA QLM signal processing. QLM transmits in parallel N received data symbols for each of the $n_p$ $FFT^{-1}$ signal processing steams. Each set of received N data symbols are offset in frequency by 0, $\Delta k, 2\Delta k, \ldots, (n_p-1)\Delta k$ with $\Delta k=1/n_p$ using the normalized frequency index k and are implemented in 49 by the frequency translation operator with $FFT^{-1}$ time sample index n. Following this frequency translation and $FFT^{-1}$ signal processing, the output streams of the OFDMA encoded symbols for the $n_p$ frequency offsets are summed 51 and waveform encoded. The output stream of up-sampled complex baseband signal samples 52 $\{z(t_i)\}$ at the digital sample times $t_i$ with digitization index i, is handed over to the digital-to-analog converter DAC, and the DAC output analog signal z(t) is single sideband SSB upconverted 52 to RF and transmitted as the analog signal v(t) wherein v(t) is the real part of the complex baseband signal z(t) at the RF frequency. Non-ideal OFDMA has a separation interval between contiguous $FFT^{-1}$ data blocks to allow for timing offsets and the rise and fall times of the channelization filter prior to the $FFT^{-1}$ processing.

FIG. 21 is a OFDM receiver block diagram modified to support OFDM QLM from the OFDM QLM transmitter in FIG. 20. Receive signal processing for QLM demodulation starts with the wavefronts 54 incident at the receiver antenna for the $n_u$ users $u=1, \ldots, n_u \leq N_c$ which are combined by addition in the antenna to form the receive Rx signal $\hat{v}(t)$ at the antenna output 55 where $\hat{v}(t)$ is an estimate of the transmitted signal v(t) 52 in FIG. 20 that is received with errors in time $\Delta t$, frequency $\Delta t$ and phase $\Delta \theta$. This received signal $\hat{v}(t)$ is amplified and downconverted to baseband by the analog front end 56, synchronized (synch.) in time t and frequency f, waveform removed to detect the received QLM signal at the QLM symbol rate, inphase and quadrature detected (I/Q), and analog-to-digital ADC converted 57. ADC output signal is demultiplexed into $n_p$ parallel signals 58 which are offset in frequency by $0, -\Delta k, -2\Delta k, \ldots, -(n_p-1)\Delta k$ wherein $\Delta k=1/n_p$ and processed by the FFT's. Outputs are trellis decoded 59 and further processed 60, 61 to recover estimates of the transmitted data $d_k$ with k indexed over the data words.

FIG. 22 is an ideal LTE SC-OFDM transmitter block diagram modified to support SC-OFDM QLM with timing offsets as the differentiating parameter to increase the symbol transmission rate from $1/T_s$ to the QLM rate $n_p/T_s$ and with an increase in transmitter power to support this increased data rate. FIG. 22 is ideal in the assumption of the use of orthogonal Wavelet multiplexing OWDM disclosed in U.S. Pat. No. 7,376,688 wherein the Wavelets provide almost ideal communications performance in that the symbol rates $1/T_s$ are equal to the bandwidth $B=1/T_s$ and they are orthogonal in frequency offsets $1/T_s$ and time offsets $T_s$, and the transmission is over a single channel and bandwidth in order to apply to all of the IEEE standard SC-OFDM LTE systems. Obviously, the transmitter block diagram applies to other waveforms equivalent to the Wavelet. Signal processing starts with the stream of user input data words $(d_k)$ 111 with k indexed over the words. Frame processor 112 accepts these data words and performs the turbo error correction encoding, error detection cyclic redundant encoding CRC, frame formatting, and passes the outputs to the symbol encoder 113 which encodes the frame data words into data symbols for handover to the OWDM QLM transmit signal processing. The $n_p$ time delays $0, \Delta T_s, 2\Delta T_s, 3\Delta T_s, \ldots, (n_p-1)\Delta T_s$ wherein $\Delta T_s=T_s/n_p$, are performed 114 and the output streams of the OWDM waveform encoded 115 symbols for the $n_p$ time delays are summed 116 and passband waveform encoded and the up-sampled output stream of complex baseband signal samples 117 $\{z(t_i)\}$ at the digital sample times $t_i$ with digitization index i, is handed over to the DAC and the DAC output analog signal z(t) is single sideband SSB upconverted 117 to RF and transmitted as the analog signal v(t) wherein v(t) is the real part of the complex baseband signal z(t) at the RF frequency. It is convenient to refer to the OFDM LTE communications as LTE(OFDM).

FIG. 23 is a LTE SC-OFDM QLM receiver block diagram modified to support SC-OFDM QLM from the transmitter in FIG. 22. Receive signal processing for QLM demodulation starts with the wavefronts 131 incident at the receiver antenna for the $n_u$ users $u=1, \ldots, n_u \leq N_c$ which are combined by addition in the antenna to form the receive Rx signal $\hat{v}(t)$ at the antenna output 132 where $\hat{v}(t)$ is an estimate of the transmitted signal v(t) 117 in FIG. 22 that is received with errors in time $\Delta t$, frequency $\Delta f$, and phase $\Delta \theta$. This received signal $\hat{v}(t)$ is amplified and downconverted to baseband by the analog front end 133, synchronized (synch.) in time t and frequency f, waveform removed to detect the received QLM signal at the QLM symbol rate, inphase and quadrature detected (I/Q) and analog-to-digital ADC converted 134. ADC output signal is demultiplexed into $n_p$ parallel signals 135 which are offset in time by $0, \Delta T_s, 2\Delta T_s, \ldots, (n_p-1)\Delta T_s$ and processed by the OWDMA decoders. Outputs are trellis decoded 136 with an algorithm comparable to the algorithm defined in FIG. 9. Outputs are further processed 137, 138 to recover estimates of the transmitted data $d_k$ wherein k is indexed over the data words.

FIG. 24 illustrates a representative segment of current cellular communications networks with a schematic layout of part of a cellular network which depicts cells 1, 2, 3, 4 that partition this portion of the area coverage of the network, depicts a user (network user) 5 located within a cell with forward and reverse communications links 6 with the cell-site base station (access point/hub) 7, depicts the base station communication links 8 with the MSC (mobile switching center) or the WSC (wireless switching center) 9, and depicts the MSC/WSC communication links with another base station (access point/hub) 17, with another MSC/WSC 16, and with external elements 10, 11, 12, 13, 14, 15. One or more base stations are assigned to each cell or multiple cells or sectors of cells depending on the application. One of the base stations 9 in the network serves as the MSC/WSC which is the network system controller and switching and routing center that controls all of user timing, synchronization, and traffic in the network and with all external interfaces including other MSC's. External interfaces could include satellite 10, PSTN (public switched telephone network) 11, LAN (local area network) 12, PAN (personal area network) 13, UWB (ultra-wideband network) 14, and optical networks 15. As illustrated in the figure, base station 7 is the nominal cell-site station for cells i−2, i−1, i, i+1 identified as 1, 2, 3, 4, which means it is intended to service these cells with overlapping coverage from other base stations (access points/hubs). The cell topology and coverage depicted in the figure are intended to be illustrative and the actual cells could be overlapping and of differing shapes. Cells can be sub-divided into sectors. Not shown are possible subdivision of the cells into sectors and/or combining the cells into sectors. Each user in a cell or sector communicates with a base station which should be the one with the strongest signal and with available capacity. When mobile users cross over to other cells and/or are near the cell boundary a soft handover scheme is employed for CDMA in which a new cell-site base station is assigned to the user while the old cell-site base station continues to service the user for as long as required by the signal strength.

FIG. 25 depicts a MIMO scenario for the cellular networks in FIG. 24 (2) using the multiple access OFDM QLM and SC-OFDM QLM communications encoding of the encoded data symbols transmitting signal information, followed by space-time coding $H_0$, $C_0$, L as disclosed in U.S. Pat. No. 7,680,211 for the communications architecture consisting of N Tx antennas 106 communicating through a scintillated, dispersive, fading, and multipath links 107 to M Rx antennas 108 for the forward communications links for the cellular communications 6 from the access point or hub 7 to the network user 5 in FIG. 24. Transmission starts with the input Tx data d 101 which is encoded, interleaved, formatted, and data symbol encoded 102 followed by the OFDM QLM and SC-OFDM QLM encoding 103 to generate the input signal (symbol) vector X 104 whose elements are the encoded data symbols from 103. This encoding includes the Tx signal processing required to support Rx signal processing equalization such as frequency domain equalization (FDE) and Wavelet domain equalization (WDE) to correct for scintillation, dispersion, fading, and multipath. Tx symbol vector X is space-time encoded 105 using $H_0$/H, $C_0$, L where ($H_0$/H) is equal to $H_0$ with the elements of H removed since they are generated by the Tx-to-Rx communication links, and handed over to the Tx antenna subsystem which performs the digital-to-analog conversion, symbol waveform modulation, single-sideband upconversion, power amplification, and transmission by the antenna elements for each of the N Tx transmissions by the access point or hub. Rx signals received by the network user antennas are amplified, filtered, down-converted, detection filtered and analog-to-digital converted to recover the Rx symbol vector Y 109. Space-time decoding 110 defined in scenarios 1, 2, 3, 4 is implemented to recover the ML estimates $\hat{x}$ 111 of X which are processed by the OFDM QLM and SC-OFDM QLM decoding and equalization 112 followed by deinterleaving and turbo decoding 113 to recover the ML estimates $\hat{d}$ 114 of the Tx data d 101.

A multi-scale MS code can be implemented with modest complexity in order to improve the bit-error-rate BER performance of OFDM/LTE(OWDM), WiFi, WiMax, SC-OFDM QLM by spreading each transmitted data symbol over the data band and over the data packet. This technique has been disclosed in U.S. Pat. No. 7,907,512. Jensen's inequality from mathematical statistics proves that this uniform spreading of the transmit signals using MS provides the best communications BER performance.

This patent covers the plurality of everything related to QLM generation for WiFi, WiMax, LTE, OFDM, and SC-OFDM waveforms, QLM demodulation for WiFi, WiMax, LTE, OFDM, and SC-OFDM waveforms, to QLM generation and data recovery of QLM, to the corresponding bounds on QLM, to all QLM inclusive of theory, teaching, examples, practice, and to implementations for related technologies. The representative trellis and ML algorithms for QLM demodulation are examples to illustrate the methodology and validate the performance and are representative of all QLM demodulation algorithms including all maximum likelihood ML architectures, maximum a posteriori MAP trellis and ML trellis architectures, maximum a priori, finite field techniques, direct and iterative estimation techniques, trellis symbol and iterative trellis symbol and with/without simplifications, trellis bit and iterative trellis bit and with/without simplifications and with/without bit error correction coding, sequential relaxation, and all other related algorithms whose principal function is to recover estimates of the transmitted symbols and information for QLM parallel layered modulation and QLM increase in the data symbol rates as well as data recovery related to QLM and the QLM bounds.

What is claimed is:

1. A method for implementation of maximum a-posteriori (MAP) trellis symbol demodulation of quadrature amplitude modulation (QAM) in a communications receiver for a quadrature layered modulation (QLM) communications link wherein QAM maps a data symbol onto a complex plane using amplitude and phase to specify each data point of the QAM constellation, said method comprising the steps:

receiving QLM data symbols indexed on k=1, 2, ..., n for n data symbols, evaluating correlation coefficients for the received QLM data symbols, establishing trellis states and trellis paths for each of the data symbols with properties there are $n_s\hat{}(2n_c-2)$ trellis states wherein "$n_s$" is a number of states of each data symbol, and "$n_c$" is a number of symmetric correlation coefficients for symmetrical correlation functions, there are $n_s\hat{}2n_c-1$ trellis paths from trellis state $S_{k-1}$ for data symbol k−1 to a new trellis state $S_k$ for data symbol k, index jxi=0, 1, 2 ... $n_s\hat{}(2n_c-1)-1$ is a trellis path index from $S_{k-1}$ to $S_k$ using $n_s$-ary index symbols jxi reading from left to right wherein "i" is an index for a new data symbol, "i" is an index for a last data symbol and "x" is a set of $n_s$-ary index data symbols between "j" and "i", index xi is over $n_s\hat{}(2n_2-2)$ trellis states $S_k$(xi), index jx is over $n_s\hat{}(2n_c-2)$ trellis states $S_{k-1}$ (jx), creatine a D row b $n_s\hat{}(2n_c-2)$ column memory "M" for storing trellis path decisions wherein D is a multiple of $n_c$, initializing trellis for k=0, implementing the MAP trellis symbol demodulation algorithm for each data symbol k starting with k=1 evaluating hypothesized values $\hat{x}_k$(jxi) of received QLM correlated data symbols for all paths jxi, measuring the received QLM data symbol $y_k$ for data symbol k, evaluating a logarithm state transition decisioning metric R(jxi) which is a function of $\hat{x}_k$(jxi) and $y_k$ for symbol k for all possible paths jxi from $S_{k-1}$(jx) to $S_k$(xi), finding a best path metric $\alpha_k$(xi) and corresponding path jxi from $S_{k-1}$(jx) to $S_k$(xi) by using a logarithm decisioning equation $\alpha_k$=max $\{\alpha_{k-1}$(jx)+$R_k$(jxi)$\}$ which finds the j that maximizes "max" a sum "$\alpha_{k-1}$ (jx)+$R_k$(jxi)", using said $\alpha_k$(xi) and corresponding jxi to define a data symbol estimate $\hat{x}_k$ for $S_k$(xi), continuing for k<D to fill memory M from a to down by replacing column xi with column jx after moving column jx down by one symbol and placing $\hat{x}_k$ in a first row, for all xi, continuing for k≥D to replenish memory M from the top down by replacing column xi with column ix after moving column ix down by one symbol and placing $\hat{x}_k$ in the first row, for all xi, selecting for k≥D the $\hat{x}_{k-D}$ in column jx in a deleted bottom row corresponding to a largest value of $\alpha_k$(jx) over all jx, as the estimate of data symbol k−D, continuing for k>n without replenishing memory M to complete the estimates of the n data symbols, performing error correction decoding of these estimates of the n data symbols, handing over said demodulated and decoded data symbol information to the communications receiver for further processing, and which demonstrates said method discloses a novel means to implement the QLM communications link using said MAP trellis demodulation algorithm in said communications receiver combined with error correction decoding to recover a transmitted communications data.

2. A method for implementation of a word-sliced maximum a-posteriori (MAP) trellis symbol demodulation of quadrature amplitude modulation (QAM) in the communications receiver for a quadrature layered modulation (QLM) communications link wherein QAM maps a data symbol onto a complex plane using amplitude and phase to specify each data point of the QAM constellation, said method in claim 1 further comprising the steps:

implementing the word-sliced MAP trellis demodulation algorithm by 1) implementing step 1 using the MAP trellis symbol demodulation algorithm in claim 1 with data symbols reduced to a first word slice $b_{w1}$ for each of the received correlated data symbols and implementing error correction decoding and encoding to correct the MAP trellis symbol demodulation algorithm decisioning errors, 2) in step 2 repeating said step 1 using two data symbol word slices $b_{w1}b_{w2}$ wherein word slice $b_{w1}$ is an estimate from the step 1 and the second word slice $b_{w2}$ is estimated by said trellis symbol demodulation algorithm in step 2, 3) for additional word slices in the data symbol words, in step 3 repeating said step 2 using three data symbol word slices $b_{w1}b_{w2}b_{w3}$ wherein word slice $b_{w1}b_{w2}$ is the estimate from steps 1, 2 with word slice $b_{w3}$ estimated by said MAP trellis symbol demodulation algorithm in step 3, 4) continuing with said steps until a final pass to estimate the data symbols, 5) performing error correction decoding of these estimated data symbols, handing over said demodulated and decoded data symbol information to the communications receiver for further processing, and which demonstrates said method provides a novel means to implement the QLM communications link using said word-sliced MAP trellis symbol demodulation algorithm in said communications receiver combined with error correction decoding to recover a transmitted communications data.

3. A method for implementation of reduced path maximum a-posteriori (MAP) trellis symbol demodulation of quadrature layered modulation (QLM) in a communications receiver for a QLM communications link, said method comprising the steps:

1) implementing step 1 using a word-sliced maximum a-posteriori (MAP) trellis symbol demodulation algorithm for a first word slice $b_{w1}$ for each of a received correlated data symbols, selecting a best p≥1 paths for each data symbol from among $2^{\wedge}b_{w1}(2n_c-2)$ paths in the first step wherein $n_c$ is a number of symmetric correlation values of detected data symbols, storing the path, and p state values for a next step, 2) implementing step 2 by using the word-sliced MAP trellis symbol demodulation algorithm for a second word slice $b_{w2}$ for each of the received correlated data symbols for each of the p paths using the path, and p state values from step 1 for word slice $b_{w1}$, selectins the best path for each of the p paths from among the $2^{\wedge}b_{w2}(2n-2)$ paths in step 2 for each path and storing the path, and p state values for the next step, 3) continuing with implementation of the steps until each data symbol word has been processed, using the path, and p state values for final processing by the MAP trellis symbol demodulation algorithm to estimate the data symbol information, performing error correction decoding of the data symbol information, handing over said demodulated and decoded data symbol information to the communications receiver for further processing, and which demonstrates said method discloses a novel means to implement the QLM communications link using said reduced path MAP trellis symbol demodulation algorithm in said communications receiver combined with error correction decoding to recover a transmitted communications data.

4. A method for implementation of maximum a-posteriori (MAP) trellis demodulation of quadrature layered modulation (QLM) including sidelobes of QLM data symbols in a communications receiver for a QLM communications link, said method comprising the steps:

1) implementing step 1 using a trellis data symbol demodulation algorithm to demodulate mainlobes of a data symbol correlation wherein the data symbol correlation consists of a mainlobe with sidelobes on both sides of the mainlobe, using the data symbol estimates from the trellis data symbol demodulation algorithms and the data symbol correlations to generate the sidelobes for each of the correlated data symbols, 2) implementing step 2 by using the sidelobe estimates from step 1 as a-priori estimates in the trellis data symbol demodulation algorithm, using the data symbol estimates from the trellis data symbol demodulation algorithms and the data symbol correlations to generate the sidelobes of the mainlobe correlation for each of the correlated data symbols, 3) implementing step 3 by using the sidelobe estimates from step 2 in the trellis data symbol demodulation algorithm for step 3, continuing the implementation steps as required for convergence to a stable solution, followed by error correction decoding, handing over said demodulated and decoded data symbol information to the communications receiver for further processing, and which demonstrates said method provides a novel means to implement the QLM communications link using said trellis data symbol demodulation algorithm including sidelobes of the QLM data symbols in said communications receiver combined with error correction decoding to recover a transmitted communications data.

5. A method for implementation of quadrature layered modulation (QLM) communications in a communications transmitter for orthogonal frequency multiplexing architectures using frequency offset as a differentiating parameter and implementing a trellis data symbol algorithm in a communications link receiver, said method comprising the steps:

generating a first communications signal over a frequency carrier frequency for a first set of N channels by modulating a first stream of N data symbols at a data symbol rate $1/T_s$ with an N-point inverse fast fourier transform ($FFT^{-1}$) waveform over a $FFT^{-1}$ block length $NT_s$ to generate N orthogonal frequency harmonics modulated with the respective data symbols and which modulated harmonics are the N channels for communications, generating a second communications signal over the same block length over the same frequency bandwidth at the same carrier frequency for a second set of N channels by modulating a second stream of N data symbols at a data symbol rate $1/T_s$ with the same $FFT^{-1}$ waveform with a frequency offset $\Delta k$ equal to $\Delta k=1/n_p$ wherein "$n_p$" is a number of QLM sets of channels in said frequency bandwidth and $FFT^{-1}$ harmonics are $e^{\wedge}j2\pi(k+\Delta k)n/N$ for normalized frequencies k=0, 1, ... N−1 corresponding to channels 0, 1, ..., N−1 wherein "j"=√(−1), "π=pi", and "n" is a time index, for any additional sets of channels, continuing generation of communication signals over a same block length over the same frequency bandwidth at the same carrier frequency by modulating additional streams of data symbols with the same waveform at the same data symbol rate as the first and second streams of data symbols with frequency offsets increasing in each communication signal in increments of $\Delta k=1/n_p$ until the $n_p$ signals are generated for $n_p$ QLM sets of channels, repeating this generation of the QLM signal for a next $FFT^{-1}$ block length $NT_s$ and continuing for subsequent block lengths, transmitting and receiving said communications signals over a QLM communications link consisting of $n_p$ QLM sets of channels, recovering data symbols of the communications signals in the communications link receiver using the trellis data symbol algorithm, combining said algorithm in the receiver with error correction decoding to recover the transmitted information wherein frequency offset has been used as the differentiating parameter to enable QLM parallel sets of channels for communications over the same frequency bandwidth at the same carrier frequency with a data symbol rate independent of a Nyquist rate equal to the communications link frequency bandwidth, and which demonstrates said method provides a novel means to implement the QLM communications link using frequency offset as the differentiating parameter and the trellis data symbol algorithm in said communications link receiver combined with error correction decoding to recover a transmitted communications data.

6. A method for implementation of quadrature layered modulation (QLM) communications in a communications transmitter for signaling architectures using timing offset as a differentiating parameter and implementing trellis demodulation in a communications link receiver, said method comprising the steps:

generating a first communications signal over a frequency bandwidth at a carrier frequency for a first channel by modulating a first stream of data symbols with a waveform occupying a bandwidth at a $1/T_s$ symbol rate wherein "$T_s$" is a time interval between contiguous symbols, generating a second communications signal over the frequency bandwidth at the same carrier frequency for a second channel by modulating a second stream of data symbols with the same waveform at the same symbol rate and with a time offset $\Delta T_s$ equal to $\Delta T_s=T_s/n_p$ wherein "$n_p$" is a number of QLM channels in said frequency bandwidth, for any additional channels, continuing generation of communication signals over the same frequency bandwidth at the same carrier frequency by modulating additional streams of data symbols with the same waveform at the same data symbol rate as the first and second streams of data symbols, with time offsets increasing in each communication signal in increments of $\Delta T_s=T_s/n_p$ until the $n_p$ signals are generated for $n_p$ QLM channels, transmitting and receiving said communications signals over a QLM communications link consisting of the $n_p$ QLM channels, recovering data symbols of the communications signals in the communications link receiver using a data symbol demodulation algorithm, combining said algorithm with error correction decoding to recover the transmitted information wherein time offset has been used as the differentiating parameter to enable QLM parallel channels of communications over the same frequency bandwidth at the same carrier frequency with a data symbol rate independent of a Nyquist rate equal to the communications link bandwidth, and which demonstrates said method discloses a novel means to implement the QLM communications link using timing offset as the differentiating parameter and said data symbol demodulation algorithm in said communications link receiver combined with error correction decoding to recover a transmitted communications data.

7. A method for design and implementation of maximum likelihood (ML) architectures for Multiple input multiple output (MIMO) systems using quadrature layered modulation (QLM) communications with a QLM demodulation algorithm in a MIMO communications receiver, said method comprising the properties:

ML architectures implement generalized orthogonal space-time codes ($C_0$) and generalizations ($H_0$) of a transmission matrix (H) that enable a MIMO communications link equation to be written $Y=H_0C_0X+N_o$ which factors out an input signal symbol vector X and allows a direct ML calculation of an estimate $\hat{X}$ of X, and where Y is a received symbol vector and $N_o$ is a received noise vector, ML architectures enable implementation of ML solutions for estimates $\hat{X}$ of an encoded data vector X of a transmission data block over time epoch T for all combinations of (N) of transmit antennas, number (M) of receive antennas, transmission matrix H, and time epoch T which are solvable with acceptable communications performance, and which demonstrates said method provides a novel means to implement QLM communications for the maximum likelihood (ML) architectures for MIMO systems using said QLM demodulation algorithms in said MIMO communications receiver combined with error correction decoding to recover a transmitted communications data.

\* \* \* \* \*